United States Patent
Higashiyama et al.

(10) Patent No.: US 8,159,722 B2
(45) Date of Patent: Apr. 17, 2012

(54) IMAGE FORMING APPARATUS AND IMAGE FORMING METHOD

(75) Inventors: Makoto Higashiyama, Kanagawa (JP); Masashi Suzuki, Saitama (JP); Tomohide Kondoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 667 days.

(21) Appl. No.: 12/391,360

(22) Filed: Feb. 24, 2009

(65) Prior Publication Data

US 2009/0213401 A1 Aug. 27, 2009

(30) Foreign Application Priority Data

Feb. 26, 2008 (JP) ................................. 2008-044155
Jan. 15, 2009 (JP) ................................. 2009-006977

(51) Int. Cl.
*G06T 5/00* (2006.01)
(52) U.S. Cl. ........ 358/3.26; 358/2.1; 358/3.24; 382/218
(58) Field of Classification Search ................. 358/3.26, 358/1.9, 2.1, 3.24; 382/218
See application file for complete search history.

(56) References Cited

U.S. PATENT DOCUMENTS

2007/0253623 A1* 11/2007 Ohira et al. ................... 382/218
2008/0044195 A1 2/2008 Higashiyama et al.

FOREIGN PATENT DOCUMENTS

JP 3556349 5/2004
JP 3715349 9/2005

* cited by examiner

*Primary Examiner* — Twyler Haskins
*Assistant Examiner* — Michael Burleson
(74) *Attorney, Agent, or Firm* — Oblon, Spivak, McClelland, Maier & Neustadt, L.L.P.

(57) ABSTRACT

An image forming apparatus capable of accurately compensating an increase or decrease of a toner area coverage resulting from shifting that is performed to correct skew is provided. A color density of image data represented by a correction target pixel is corrected such that the increase or decrease in the toner area coverage on the correction target pixel is compensated excluding a toner area coverage on the correction target pixel covered by a toner image that would be formed based on a color density of image data to be represented by a neighboring pixel of the correction target pixel. This effectively reduces banding noise on an output of the image data and prevents degradation in image quality.

5 Claims, 27 Drawing Sheets

FIG. 10
| REFERENCE COLOR | K |
|---|---|
| K-SKEW AMOUNT [μm] | 0 |
| M-SKEW AMOUNT [μm] | -110 |
| C-SKEW AMOUNT [μm] | -130 |
| Y-SKEW AMOUNT [μm] | 30 |
FIG. 11
| REFERENCE COLOR | K |
|---|---|
| K-SKEW CORRECTION AMOUNT (LINES) | 0 |
| M-SKEW CORRECTION AMOUNT (LINES) | +3 |
| C-SKEW CORRECTION AMOUNT (LINES) | +3 |
| Y-SKEW CORRECTION AMOUNT (LINES) | -1 |
FIG. 12
FIG. 13
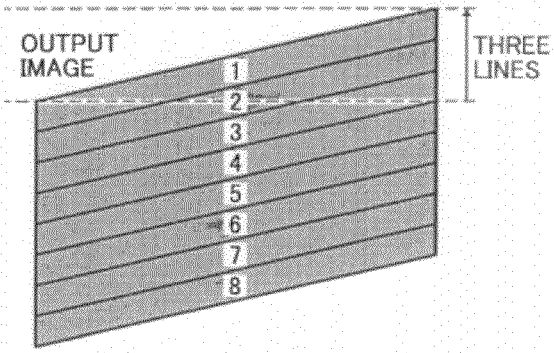
FIG. 14
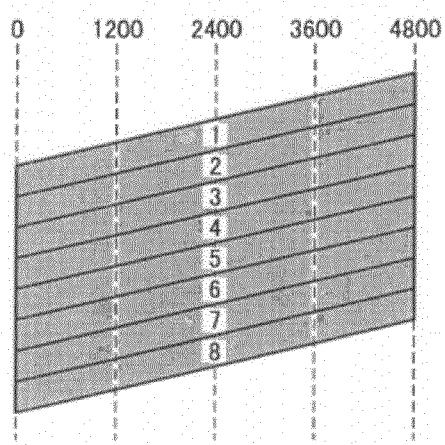
FIG. 15
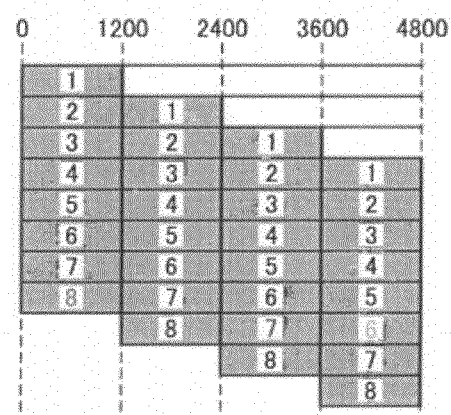

|  | 1 | 2 | 3 | 4 |
|---|---|---|---|---|
| SHIFT POSITION | 1200 | 2400 | 3600 | |
| SHIFT DIRECTION | -ve | -ve | -ve | |

FIG. 20
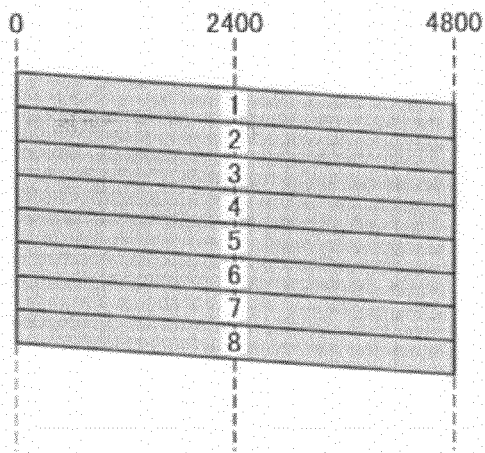
FIG. 21
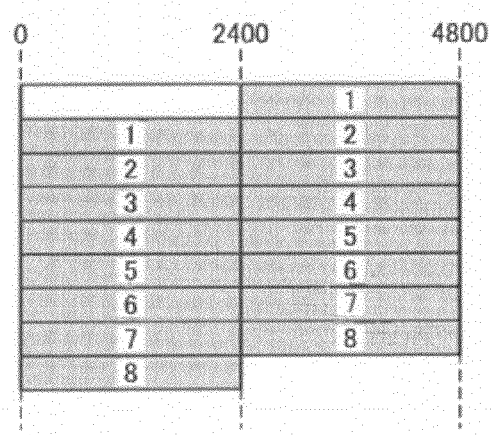
FIG. 22
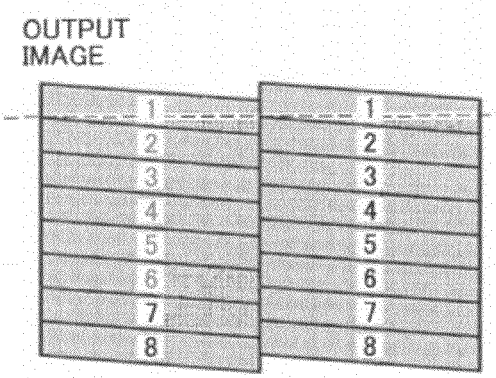
FIG. 23
| | 1 | 2 | 3 | 4 |
|---|---|---|---|---|
| SHIFT POSITION | 1200 | | | |
| SHIFT DIRECTION | +ve | | | |

| PATTERN No. | CORREC- TION TARGET PIXEL | UPPER NEIGH- BORING PIXEL | LOWER NEIGH- BORING PIXEL | LEFT NEIGH- BORING PIXEL | RIGHT NEIGH- BORING PIXEL | DENSITY CORREC- TION VALUE |
|---|---|---|---|---|---|---|
| 1 | 15 | 0 | 0 | 0 | 0 | -3 |
| 2 | 15 | 15 | 0 | 0 | 0 | -4 |
| 3 | 15 | 0 | 15 | 0 | 0 | -4 |
| 4 | 15 | 0 | 0 | 0 | 15 | -4 |
| 5 | 15 | 15 | 0 | 0 | 15 | -5 |
| 6 | 15 | 15 | 15 | 0 | 0 | -5 |
| 7 | 15 | 0 | 15 | 0 | 15 | -5 |
| 8 | 15 | 15 | 15 | 0 | 15 | -6 |

FIG. 46

| PATTERN No. | SHIFT DIRECTION | CORRECTION TARGET PIXEL | UPPER NEIGHBORING PIXEL | LOWER NEIGHBORING PIXEL | LEFT NEIGHBORING PIXEL | RIGHT NEIGHBORING PIXEL | DENSITY CORRECTION VALUE (RESULT OF CALCULATION) |
|---|---|---|---|---|---|---|---|
| 1 | DOWN | 15 | 0 | 0 | 0 | 0 | −3 |
| 2 | DOWN | 15 | 15 | 0 | 0 | 0 | −4 |
| 3 | DOWN | 15 | 0 | 15 | 0 | 0 | −4 |
| 4 | DOWN | 15 | 0 | 0 | 0 | 15 | −4 |
| 5 | DOWN | 15 | 15 | 0 | 0 | 15 | −5 |
| 6 | DOWN | 15 | 15 | 15 | 0 | 0 | −5 |
| 7 | DOWN | 15 | 0 | 15 | 0 | 15 | −5 |
| 8 | DOWN | 15 | 15 | 15 | 0 | 15 | −6 |

FIG. 50
| No. | SHIFT DIRECTION | DETERMINATION PATTERN | DENSITY CORRECTION VALUE | No. | SHIFT DIRECTION | DETERMINATION PATTERN | DENSITY CORRECTION VALUE |
|---|---|---|---|---|---|---|---|
| 0 | DOWN | 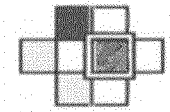 | −3 | 8 | DOWN | 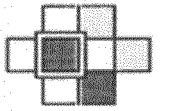 | −3 |
| 1 | DOWN | 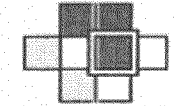 | −4 | 9 | DOWN | 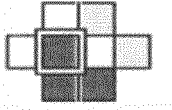 | −4 |
| 2 | DOWN | 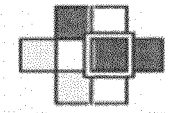 | −4 | 10 | DOWN | 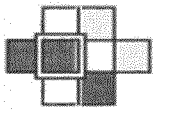 | −4 |
| 3 | DOWN | 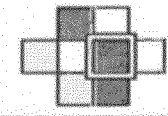 | −4 | 11 | DOWN | 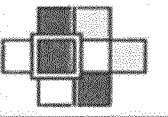 | −4 |
| 4 | DOWN | 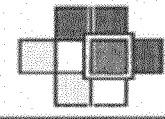 | −5 | 12 | DOWN | 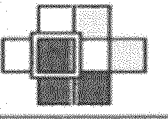 | −5 |
| 5 | DOWN | 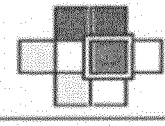 | −5 | 13 | DOWN | 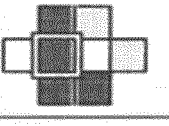 | −5 |
| 6 | DOWN | 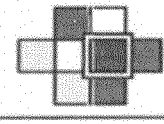 | −5 | 14 | DOWN | 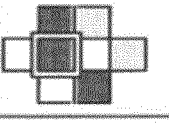 | −5 |
| 7 | DOWN | 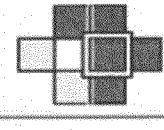 | −6 | 15 | DOWN | 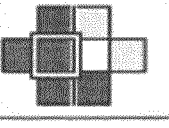 | −6 |
 PIXEL OF INTEREST
 BLACK PIXEL (DENSITY 15)
 WHITE PIXEL (DENSITY 0)
 DON'T CARE

IMAGE FORMING APPARATUS AND IMAGE FORMING METHOD

CROSS-REFERENCE TO RELATED APPLICATIONS

The present application claims priority to and incorporates by reference the entire contents of Japanese priority document 2008-044155 filed in Japan on Feb. 26, 2008 and Japanese priority document 2009-006977 filed in Japan on Jan. 15, 2009.

BACKGROUND OF THE INVENTION

1. Field of the Invention

The present invention relates to a technology for correcting color misalignment in an image forming apparatus.

2. Description of the Related Art

Occurrence of color misalignment is a critical problem in color image forming apparatuses. For this purpose, typical color image forming apparatuses have a function of detecting and reducing color misalignment. To implement such a function, in one approach, toner patterns of different colors are formed on a transfer belt, those toner patterns are detected with a photosensor, amounts of color misalignment for various causes are calculated based on the result of detection of the tonner patterns, and a feedback control is performed based on the calculated amounts of color misalignment. Examples of the causes include main-scanning-direction misregistration, sub-scanning-direction misregistration, main-scanning-direction magnification error, and skew. A feedback correction for compensating the calculated misalignment amounts is then performed to reduce the misalignment.

A color image forming apparatus performs the feedback correction at various occasions to constantly limit each misalignment amount below a predetermined value. Such feedback correction is performed, for example, when the image forming apparatus is turned on, when the image forming apparatus undergoes an environmental change such as a temperature change, and when a print count of the image forming apparatus reaches a predetermined number.

Examples of the method for correcting the color-to-color misalignment will be explained below. The main-scanning-direction misregistration and the sub-scanning-direction misregistration can be corrected by adjusting write-start timing of a laser beam on a photosensitive drum.

The main-scanning-direction magnification error can be electrically corrected by adjusting a pixel clock.

Skew of a laser beam that performs scanning exposure can be corrected mechanically, or by using an image processing technique. The method of mechanically correcting the skew uses an adjusting mechanism that is used to adjust a position of a mirror inside a laser-beam write unit to correct the skew. However, to implement this method automatically, an actuator such as a mirror-displacing motor is required to move the mirror, which means additional cost. This method is further disadvantageous in making it difficult to configure the laser-beam write unit compact.

The image processing technique for correcting the skew of a laser beam is as follows. A portion of image data is stored in a line memory that has a capacity to store therein one line of image data in the main-scanning direction. Pixels belonging to the one line of the image data in the line memory are then divided into a plurality of pixel blocks. When reading (outputting) the image data in each of the pixel blocks in the line memory, the order of reading the image data in each of the pixel blocks is changed so that the image data is shifted in a direction opposite to a skew direction. Accordingly, color-to-color skew can be corrected. Because this method requires only one additional line memory of a size corresponding to a desired correction area, this method is advantageous in being implementable with a relatively small additional cost as compared with that of the mechanical correcting method. This correcting method based on the image processing technique is effective not only for skew correction but also for reducing the degree of distortion resulting from the property of a lens in the laser-beam write unit or the like.

However, the method based on the image processing technique is disadvantageous in that because relation between neighboring pixels on a shift position changes, a color density can be locally increased or decreased. This can result in banding noise extending in the sub-scanning direction on an output image (for example, an image printed on a printing paper). In particular, such local color density increase or decrease frequently occurs on an image that is processed by using a digital halftoning method such as dithering, and produces banding noise extending in the sub-scanning direction.

Japanese Patent No. 3715349 discloses a conventional technique for correcting skew of an image and reducing banding noise that can result from the skew correction. In the conventional technique, it is determined whether a pixel of interest is at a shift position. If the pixel of interest is at the shift position, and when a neighboring pixel in the main-scanning direction of the pixel of interest has changed and a pixel pattern of pixels in the vicinity of the pixel of interest matches with a predetermined pattern, density correction is performed for the pixel of interest. This density correction is performed according to a set of the matched pattern and the position where the neighboring pixel changes.

Although the conventional technology disclosed in Japanese Patent No. 3715349 teaches to perform the density correction of the pixel of interest, it does not teach how to determine the amount of the density correction. Accordingly, the conventional technology can reduce banding noise by a certain degree but not sufficiently. In particular, in a case of an image having undergone digital halftoning such as dithering, a toner area coverage is likely to be increased or decreased by the shifting of image. Hence, in some cases, banding noise is reduced at certain gray scales while banding noise is stressed rather than reduced at other certain gray scales.

SUMMARY OF THE INVENTION

It is an object of the present invention to at least partially solve the problems in the conventional technology.

According to an aspect of the present invention, there is provided an image forming apparatus including a skew correction unit that performs skew correction on image data by dividing pixels that belong to one line in a main-scanning direction of the image data into pixel blocks at at least one shift position and shifting a pixel block of the pixel blocks in a sub-scanning direction against a direction of skew; a noise determining unit that determines whether a pixel of interest that is on the shift position is a noise-inducing pixel, the pixel of interest being each pixel on the shift position, the noise-inducing pixel being a pixel that leads to local color density change because of a change in relationship with an adjacent pixel of the noise-inducing pixel; a selecting unit that selects, when the pixel of interest is determined as being the noise-inducing pixel, any one of the pixel of interest and a pixel in the vicinity of the pixel of interest as a correction target pixel on which correction of a color density is to be performed; a density determining unit that determines a color density of image data represented by a neighboring pixel of the correction target pixel; and a correcting unit that corrects the color density of the image data to be represented by the correction target pixel based on an area on the correction target pixel to be covered by a toner image that would be formed based on the color density determined by the density determining unit.

According to another aspect of the present invention, there is provided an image forming apparatus including a skew correction unit that performs skew correction on image data by dividing pixels that belong to one line in a main-scanning direction of the image data into pixel blocks at at least one shift position and shifting a pixel block of the pixel blocks in a sub-scanning direction against a direction of skew; a storage unit that stores therein determination patterns, shift directions, and density correction values, wherein the determination patterns, the shift directions, and the density correction values are mapped to one another, each of the determination patterns defines a pixel arrangement in which a pixel of interest that is on the shift position is a noise-inducing pixel that leads to local color density change because of a change in relationship with an adjacent pixel of the noise-inducing pixel, and the density correction value is for use in correction of a color density of image data represented by a correction target pixel in the pixel arrangement, the correction being to be performed based on an area on the correction target pixel to be covered by a toner image that would be formed based on a color density of image data to be represented by a neighboring pixel of the correction target pixel; a shift-direction determining unit that determines whether a pixel arrangement and a shift direction of pixels in the vicinity of the shift position match the pixel arrangement of the determination pattern stored in the storage unit and the shift direction mapped to the determination pattern and stored in the storage unit; a correction-target-pixel determining unit that determines the noise-inducing pixel as being the correction target pixel when the pixel arrangement and the shift direction in the vicinity of the shift position are determined to match the determination pattern and the shift direction stored in the storage unit; and a correcting unit that reads the density correction value mapped to the determination pattern and to the shift direction from the storage unit, and corrects the color density of the image data to be represented by the correction target pixel by using the density correction value.

According to still another aspect of the present invention, there is provided an image forming method including performing skew correction on image data by dividing pixels that belong to one line in a main-scanning direction of the image data into pixel blocks at at least one shift position and shifting a pixel block of the pixel blocks in a sub-scanning direction against a direction of skew; determining whether a pixel of interest that is on the shift position is a noise-inducing pixel, the pixel of interest being each pixel on the shift position, the noise-inducing pixel being a pixel that leads to local color density change because of a change in relationship with an adjacent pixel of the noise-inducing pixel; selecting, when the pixel of interest is determined as being the noise-inducing pixel, any one of the pixel of interest and a pixel in the vicinity of the pixel of interest as a correction target pixel on which correction of a color density is to be performed; determining a color density of image data represented by a neighboring pixel of the correction target pixel; and correcting the color density of the image data to be represented by the correction target pixel based on an area on the correction target pixel to be covered by a toner image that would be formed based on the color density having been determined.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a table of exemplary skew amounts relative to a reference color K (black) for a resolution of 600 dots per inch (dpi) in the sub-scanning direction;

FIG. 11 is a table of exemplary skew correction amounts obtained from the skew amounts in the table of FIG. 10;

FIGS. 12 to 17 are schematic diagrams for explaining a first skew correction method by way of an example;

FIGS. 18 to 23 are schematic diagrams for explaining a second skew correction method by way of an example;

FIG. 46 is a table containing density correction values calculated from color densities of image data represented by neighboring pixels by using Equation (1) according to a second embodiment of the present invention;

FIG. 50 is a table of examples of determination patterns, shift positions, and density correction values stored in a RAM.

DETAILED DESCRIPTION OF THE PREFERRED EMBODIMENTS

Exemplary embodiments of the present invention are described in detail below with reference to the accompanying drawings. Color copiers will be described below as specific examples of image forming apparatuses according to the embodiments. However, applications of the present invention are not limited to color copiers, and the present invention can be applied to any apparatus that performs skew correction by means of image processing. Examples of such an apparatus include a facsimile and a multifunction product (MFP) that performs more than one function in a single casing, such as copying, faxing, scanning, and printing. The configuration of a color copier and skew correction according to an embodiment of the present invention will be described first, which will be followed by descriptions about the configuration and the skew correction that feature the present embodiment.

Figure 1:
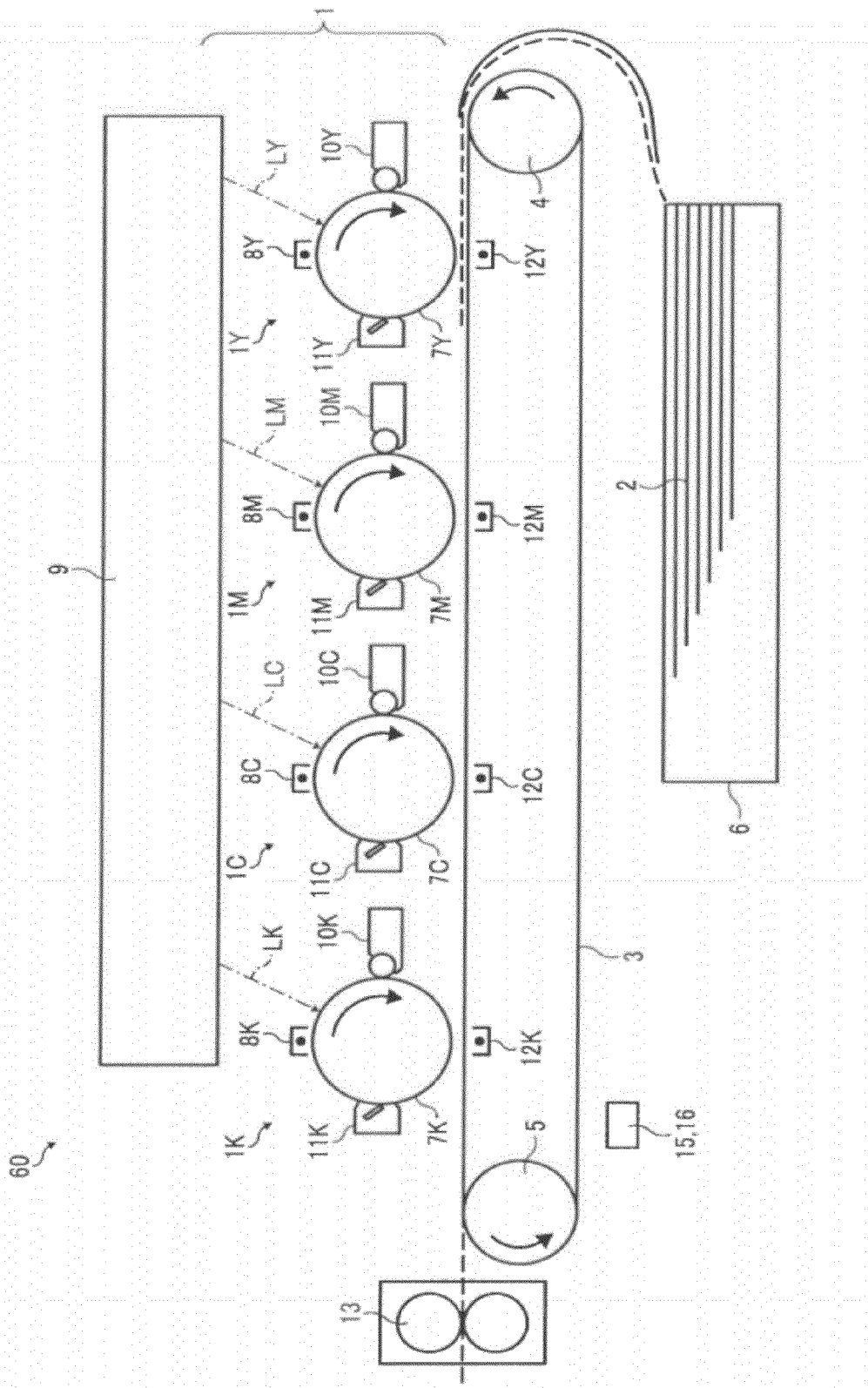
FIG. 1 is a schematic front view of an image forming unit, an exposure unit, and a transfer belt for explaining an image forming principle of a color copier according to a first embodiment of the present invention.

A principle of image forming to be performed by a color copier 60 according to a first embodiment of the present invention will be described with reference to FIG. 1. As shown in FIG. 1, the color copier 60 includes an image forming unit 1, an exposure unit 9, and a transfer belt 3. The color copier 60 forms images on a transfer sheet by using the technique of electrophotography.

The color copier 60 is a what is called tandem-type image forming apparatus, moreover, the color copier 60 employs a direct transfer method. In this color copier 60, image forming units 1Y, 1M, 1C, and 1K that form images (toner images) of four colors (yellow (Y), magenta (M), cyan (C), and black (K)) are linearly arranged in the direction of movement of the endless transfer belt 3. The transfer belt 3 conveys a transfer sheet 2 sequentially from under the image forming unit 1Y to the image forming unit 1K. The image forming units 1Y, 1M, 1C, and 1K are parts of the image forming unit 1. Meanwhile, in the following description, units being identical in configuration but different from one another only in toner color will be referred to with a reference symbol indicating the color omitted from its reference numeral in some cases. For example, the term "the image forming unit 1" will be used below to denote an arbitrary one of the image forming units 1Y, 1M, 1C, and 1K. The transfer sheet 2 is a transfer medium such as a printing paper.

The transfer belt 3 is wound around a drive roller 4 that rotates as a driving member and a driven roller 5 that is rotated by the drive roller 4. As the drive roller 4 rotates, the transfer belt 3 is rotated. One or more transfer sheets 2 are stacked in a paper feed tray 6 that is arranged below the transfer belt 3. The topmost one of the transfer sheets 2 is fed toward the transfer belt 3 by using a not shown conveying mechanism. The transfer sheet 2 sticks onto the surface of the transfer belt 3 by electrostatic attraction. The transfer sheet 2 is then conveyed to a position that is under the image forming unit 1Y to form a Y-toner image on the transfer sheet 2.

The image forming unit 1 includes a photosensitive drum 7 (7Y, 7M, 7C, 7K), an electrostatic charger 8 (8Y, 8M, 8C, 8K), a developing unit 10 (10Y, 10M, 10C, 10K), a photosensitive drum cleaner 11 (11Y, 11M, 11C, 11K), and a transfer unit 12 (12Y, 12M, 12C, 12K). The electrostatic charger 8, the developing unit 10, the photosensitive drum cleaner 11, and the transfer unit 12 are arranged around the photosensitive drum 7.

The surface of the photosensitive drum 7Y of the image forming unit 1Y is uniformly charged by the electrostatic charger 8Y, thereafter exposed to a laser beam LY in the exposure unit 9 for a yellow toner image. Hence, a latent image is formed on the surface of the photosensitive drum 7Y. The developing unit 10Y develops this latent image and forms a toner image on the photosensitive drum 7Y. The transfer unit 12Y transfers this toner image onto the transfer sheet 2 at a position (transfer position) where the photosensitive drum 7Y comes into contact with the transfer sheet 2 on the transfer belt 3. Hence, a single-color i.e., yellow, image is formed on the transfer sheet 2. Residual toner is removed from the photosensitive drum 7Y, from which the image has been transferred, by the photosensitive drum cleaner 11Y to prepare the photosensitive drum 7Y for subsequent image forming.

The transfer sheet 2 onto which the single-color (Y)-toner image has been transferred by the image forming unit 1Y is conveyed to the image forming unit 1M by the transfer belt 3. In the image forming unit 1M, an M-toner image is similarly formed on the photosensitive drum 7M and transferred in a superimposed manner onto the transfer sheet 2. The transfer sheet 2 is subsequently conveyed to the image forming units 1C and 1K in this order where a C-toner image and a K-toner image are similarly formed, respectively, and transferred onto the transfer sheet 2 to form a full-color image on the transfer sheet 2.

When the transfer sheet 2 on which the full-color image is formed comes out of the image forming unit 1K, the transfer sheet 2 is peeled away from the transfer belt 3. The full-color image is fixed onto the transfer sheet 2 in a fixing unit 13. Thereafter, the transfer sheet 2 is discharged out of the color copier 60.

Occurrence of color misalignment is a critical problem in tandem-type color image forming apparatuses. How the color copier 60 corrects color-to-color misalignment will be described below.

When performing color-to-color misalignment, correction patterns 14 of the four colors of are formed on the transfer belt 3 in the manner explained above. Optical detection sensors 15 and 16 detect the correction patterns 14 and output detection signals for use in calculation of color-to-color misalignment amounts for each of the various causes of the color-to-color misalignment. The causes of the color-to-color misalignment can be main-scanning-direction misregistration and sub-scanning-direction misregistration, main-scanning-direction magnification error, and skew. The main-scanning direction is orthogonal to the direction of movement of the transfer belt 3, i.e., parallel to rotation axes of the photosensitive drums 7Y, 7M, 7C, and 7K. The sub-scanning direction is parallel to the direction of movement of the transfer belt 3, i.e., perpendicular to the rotation axes of the photosensitive drums 7Y, 7M, 7C, and 7K. The misalignment amounts are compensated for each of the causes to correct the misalignment. The color copier 60 corrects color-to-color misalignment by using the correction patterns 14 prior to actually forming a full-color image on the transfer sheet 2.

Figure 2:
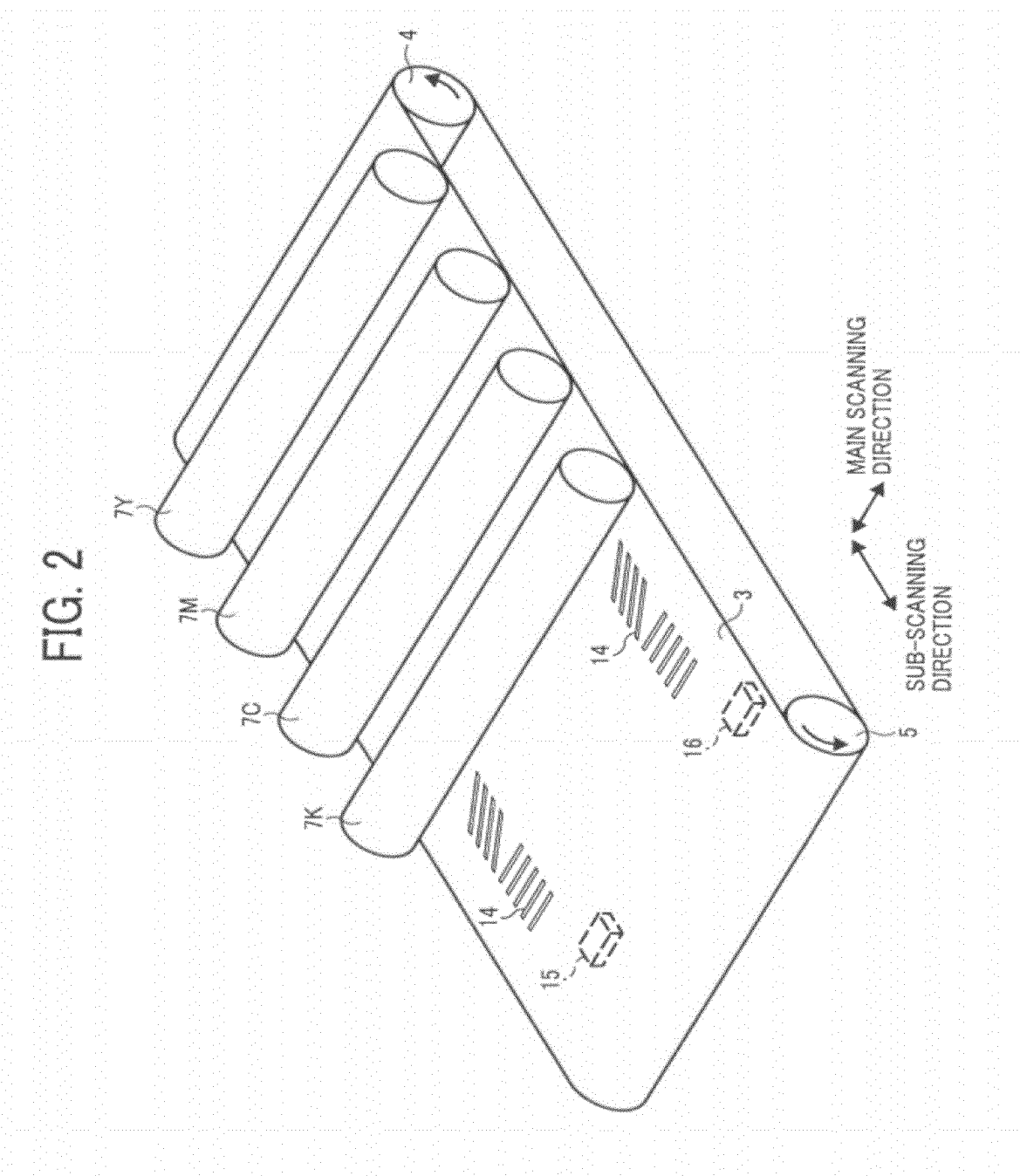
FIG. 2 is a perspective view of a transfer belt, on which correction patterns are formed, of the color copier shown in FIG. 1.

FIG. 2 is a perspective view of the transfer belt 3 on which the correction patterns 14 are formed. In the color copier 60, the image forming units 1Y, 1M, 1C, and 1K form the correction patterns 14 for use in correction of color-to-color misalignment on the transfer belt 3. The correction patterns 14 are detected by the detection sensors 15 and 16. In the example shown in FIG. 2, the detection sensors 15 and 16 are arranged on opposite ends of the transfer belt 3 in the main-scanning direction. The correction patterns 14 are formed on the transfer belt 3 at positions corresponding to the detection sensors 15 and 16. While the correction patterns 14 are moved by rotation of the transfer belt 3 in the direction shown in FIG. 2, the correction patterns 14 are detected by the detection sensors 15 and 16 when the correction patterns 14 pass through detection areas of the detection sensors 15 and 16. When the correction patterns 14 are detected, various misalignment amounts are obtained by calculations based on the results of the detection. Examples of the misalignment amounts include main-scanning-direction magnification error amounts, main-scanning-direction misregistration amounts, sub-scanning direction misregistration amounts, skew amounts, and distortion amounts. Misalignment correction amounts for each of these misalignment components are calculated from the misalignment amounts.

Figure 3:
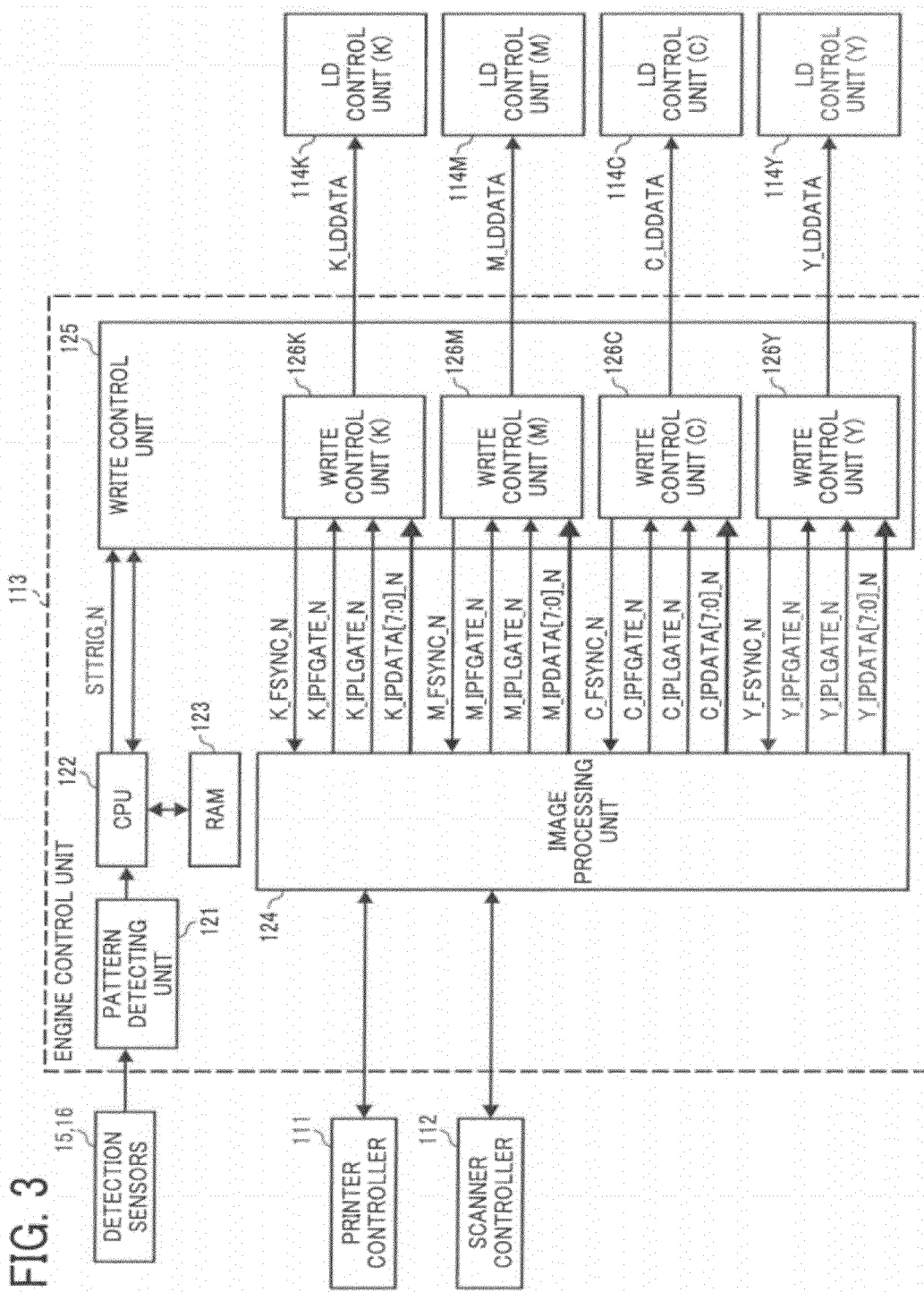
FIG. 3 is a block diagram of an exemplary configuration of a mechanism that performs write control and misalignment correction in the color copier shown in FIG. 1.

A block diagram and operations relevant to control of the color copier 60 will be described below. FIG. 3 is a block diagram of an exemplary configuration of a mechanism of the color copier 60 that performs write control and misalignment correction. Processing units in the color copier 60 that perform the misalignment correction include the detection sensors 15 and 16, a printer controller 111, a scanner controller 112, an engine control unit 113, a laser diode (LD) control unit 114 (114K, 114M, 114C, and 114Y).

The detection sensors 15 and 16 detect positions of the correction patterns 14 formed on the transfer belt 3. The detection sensors 15 and 16 output analog detection signals indicating the positions of the detected correction patterns 14 to the engine control unit 113.

The printer controller 111 receives image data transmitted from an external apparatus (e.g., a personal computer (PC)) via a network. The printer controller 111 transfers the received image data to the engine control unit 113 (an image processing unit 124, which will be described later).

The scanner controller 112 receives scanned image data of an original from a scanner (not shown). The scanner controller 112 transfers the received scanned image data to the engine control unit 113 (the image processing unit 124).

The engine control unit 113 includes a pattern detecting unit 121, a central processing unit (CPU) 122, a random access memory (RAM) 123, the image processing unit 124, and a write control unit 125.

The pattern detecting unit 121 receives the analog detection signals from the detection sensors 15 and 16 and amplifies the analog detection signals, converts the amplified analog detection signals into digital data, and stores the converted digital data in the RAM 123.

The CPU 122 calculates the positions of the correction patterns 14 according to the digital data stored in the RAM 123, calculates misalignment amounts from the calculated positions, and then calculates misalignment correction amounts based on the calculated misalignment amounts. The misalignment amounts can be a distortion amount, a magnification error amount in the main-scanning direction, a main-scanning direction misregistration amount, a sub-scanning direction misregistration amount, and a skew amount of each color. The misalignment correction amounts can be a distortion correction amount, a main-scanning-direction-magnification correction amount, a sub-scanning-direction-registration correction amount, a sub-scanning-direction-registration correction amount, and a skew correction amount of each color.

When K is set as a reference color, the CPU 122 calculates the numbers of distorted lines of Y, M, and C relative to the reference color K based on a resolution of image data and the calculated distortion amount of each color (Y, M, C, and K). The CPU 122 determines the number of lines for a line memory of each color based on the number of distorted line relative to the reference color. The reference color is a color to be used as the reference for calculation of the distortion amount of colors other than the reference color. The reference color is assumed to be K (black).

The RAM 123 temporarily stores therein the digital data indicating the positions of the correction patterns 14 that is fed from the pattern detecting unit 121 via the CPU 122. Meanwhile, a nonvolatile memory can be used in place of the RAM 123. In this case, the digital data indicating the positions of the correction patterns 14 is stored in the nonvolatile memory.

The image processing unit 124 performs various image processing according to image data that is received by the printer controller 111 or that is transmitted from the scanner controller 112 to convert the image data into image data (e.g., 1-bit binary image data) of each color. In the first embodiment, based on sub-scanning timing signal (K,M,C,Y)_F-SYNC_N supplied from the write control unit 125 for each color, the image processing unit 124 transmits image data (K,M,C,Y)_IPDATA_N accompanied by main-scanning gate signal (K,M,C,Y)_IPLGATE_N and sub-scanning gate signal (K,M,C,Y)_IPFGATE_N, which are synchronization signals, to the write control unit 125.

The write control unit 125 includes a write control unit 126 (126K, 126M, 126C, and 126Y). The write control units 126K, 126M, 126C, and 126Y generates print timing signals that indicate the write control units 126K, 126M, 126C, and 126Y when to form latent images of the corresponding colors on the photosensitive drums 7Y, 7M, 7C, and 7K. According to the generated print timing signals, the write control unit 125 receives the image data of each color and performs various write-control image processing of the received image data to convert the image data into LD light-emission data (K,M,C,Y)_LDDATA. The write control unit 125 transmits K_LDDATA, M_LDDATA, C_LDDATA, and Y_LDDATA to the LD control unit 114K, the LD control unit 114M, the LD control unit 114C, and the LD control unit 114Y, respectively.

The LD control units 114K, 114M, 114C, and 114Y are parts of the exposure unit 9. The LD control units 114K, 114M, 114C, and 114Y receive the LD light-emission data from the write control unit 125 and output drive signals to the exposure unit 9 according to the LD light-emission data. The exposure unit 9 controls emission of laser beams LY, LM, LC, and LK toward the photosensitive drums 7Y, 7M, 7C, and 7K according to the drive signals. As a result, the laser beam LY, LM, LC, and LK form latent images on the surfaces of the photosensitive drums 7Y, 7M, 7C, and 7K.

Figure 4:
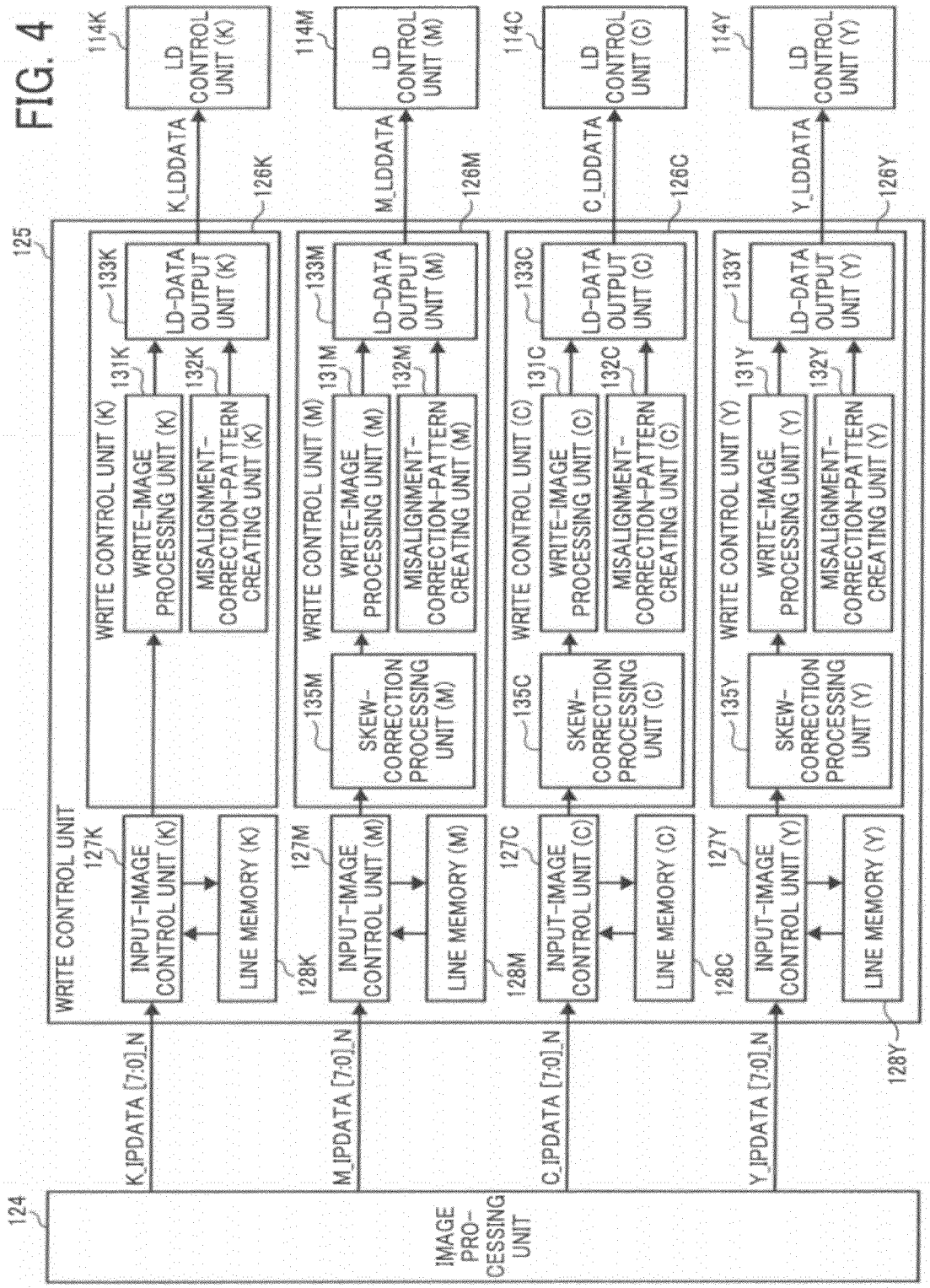
FIG. 4 is a block diagram of an exemplary configuration of a write control unit in the mechanism shown in FIG. 3.

The write control unit 125 will be described in more detail with reference to FIG. 4. FIG. 4 is a block diagram of an exemplary configuration of the write control unit 125. The write control unit 125 includes the write control units 126 (126K, 126M, 126C, and 126Y), an input-image control unit 127 (127K, 127M, 127C, and 127Y), and a line memory (128K, 128M, 128C, and 128Y).

The write control unit 126K for K, which is the reference color, includes a write-image processing unit 131K, a misalignment-correction-pattern creating unit 132K, and an LD-data output unit 133K. Each of the write control units 126M, 126C, and 126Y for M, C, and Y, which are the colors other has the reference color, has a similar configuration to that of the write control unit 126K. The write control unit 126 (126M, 126C, 126Y) includes a write-image processing unit 131 (131M, 131C, 131Y), a misalignment-correction-pattern creating unit 132 (132M, 132C, 132Y), and an LD-data output unit 133 (133M, 133C, 133Y). However, the write control units 126M, 126C, and 126Y additionally include skew-correction processing units 135M, 135C, and 135Y, respectively.

Note that in FIG. 4, sets of the main-scanning gate signal (K,M,C,Y)_IPLGATE_N, the sub-scanning gate signal (K,M,C,Y)_IPFGATE_N, and the image data (K,M,C,Y)_IPDATA_N described above with reference to FIG. 3 are collectively denoted as a write control signal (K,M,C,Y)_IPDATA[7:0]_N for clarity of description.

The input-image control unit 127 receives the write control signal (K,M,C,Y)_IPDATA[7:0]_N from the image processing unit 124. The input-image control unit 127 divides the write control signal (K,M,C,Y)_IPDATA[7:0]_N in the sub-scanning direction in such a manner that image data (image) is divided into a plurality of groups each of which includes at least one line in the main-scanning direction (hereinafter, "main-scanning line"). The main-scanning lines are stored in the line memory 128. The input-image control unit 127 transfers the main-scanning lines line-by-line to the write control unit 126 while causing the line memory 128 to be toggled.

The line memory 128 receives the write control signal (K,M,C,Y)_IPDATA[7:0]_N from the image processing and sequentially stores the write control signals therein.

The write-image processing unit 131K, 131M, 131C, and 131Y receive the write control signals (K,M,C,Y)_IPDATA [7:0]_N transferred from the input-image control units 127K, 127M, 127C, and 127Y (or the skew-correction processing units 135M, 135C, and 135Y, which will be described later), perform various write-control image processing of the write control signals, and transfer the processed write control signals to the LD-data output units 133M, 133C, and 133Y.

The misalignment-correction-pattern creating units 132K, 132M, 132C, and 132Y create the correction patterns 14 that are to be transferred onto the transfer belt 3. The misalignment correction amounts for use in correction of color-to-color misalignment on the transfer belt 3 are calculated by using the correction patterns 14.

The LD-data output units 133K, 133M, 133C, and 133Y convert the write control signals (K,M,C,Y)_IPDATA [7:0]_N that are transferred from the write-image processing units 131K, 131M, 131C, and 131Y into the LD light-emission data (K,M,C,Y)_LDDATA. The LD-data output units 133K, 133M, 133C, and 133Y transmit the LD light-emission data (K,M,C,Y)_LDDATA to the LD control units 114K, 114M, 114C, and 114Y according to the misalignment correction amounts calculated by the CPU 122 so that improper write-start timing of laser beam emission is corrected. The LD-data output units 133K, 133M, 133C, and 133Y further convert the correction patterns 14 created by the misalignment-correction-pattern creating units 132K, 132M, 132C, and 132Y into the LD light-emission data (K,M,C,Y)_LDDATA, and transmit the LD light-emission data (K,M,C,Y)_LDDATA to the LD control units 114K, 114M, 114C, and 114Y.

The skew-correction processing units 135 (135M, 135C, and 135Y) perform skew correction of the write control signals (M,C,Y)_IPDATA[7:0]_N (image data (M,C,Y)_IPDATA[7:0]_N) based on the reference color, K. More specifically, the skew-correction processing unit 135 divides pixels that belong to one main-scanning line of the image data stored in the line memory 128 into pixel blocks, shifts image data represented by one of the pixel blocks in the sub-scanning direction against a direction of skew, and transfers the image data to the write-image processing unit 131. Hence, the skew that can otherwise occur during the process of forming a toner image can be corrected. How the write control unit 126 performs an image writing process will be described in detail.

A process for writing a K-image will be described with reference to FIG. 4. The image processing unit 124 transmits image data K_IPDATA[7:0]_N to the input-image control unit 127K. The input-image control unit 127K transmits the image data to the input-image control unit 127K while temporarily storing the image data in the line memory 128K. In the write control unit 126K, the write-image processing unit 131K receives the image data from the input-image control unit 127K and transmits the image data to the LD-data output unit 133K. Based on the image data, the LD-data output unit 133K generates the light-emission data K_LDDATA for K and transmits the generated data to the LD control unit 114K.

A process for writing M-, C-, and Y-images will be described with reference to FIG. 4. The image processing unit 124 transmits image data (M,C,Y)_IPDATA[7:0]_N to the input-image control units 127M, 127C, and 127Y. The input-image control units 127M, 127C, and 127Y temporarily store the image data in the line memories 128M, 128C, and 128Y to perform skew correction according to skew correction amounts stored in the RAM 123. The skew-correction processing units 135M, 135C, and 135Y correct skew of the temporarily-stored image data according to the skew correction amounts, and transmits the corrected image data to the write-image processing units 131M, 131C, and 131Y, respectively. As in the case of the process for K, the LD-data output units 133M, 133C, and 133Y receive the image data from the write-image processing units 131M, 131C, and 131Y, generate the light-emission data (M,C,Y)_LDDATA, and transmits the generated light-emission data (M,C,Y)_LDDATA to the LD control units 114M, 114C, and 114Y, respectively. The skew correction amounts will be described below.

Meanwhile, the correction patterns 14 are formed in a manner similar to that described above; however, the correction patterns 14 are formed based on pattern image data for K-, M-, C-, and Y-correction patterns that are transmitted from the misalignment-correction-pattern creating units 132K, 132M, 132C, and 132Y and received by the LD-data output units 133K, 133M, 133C, and 133Y.

Figure 5:
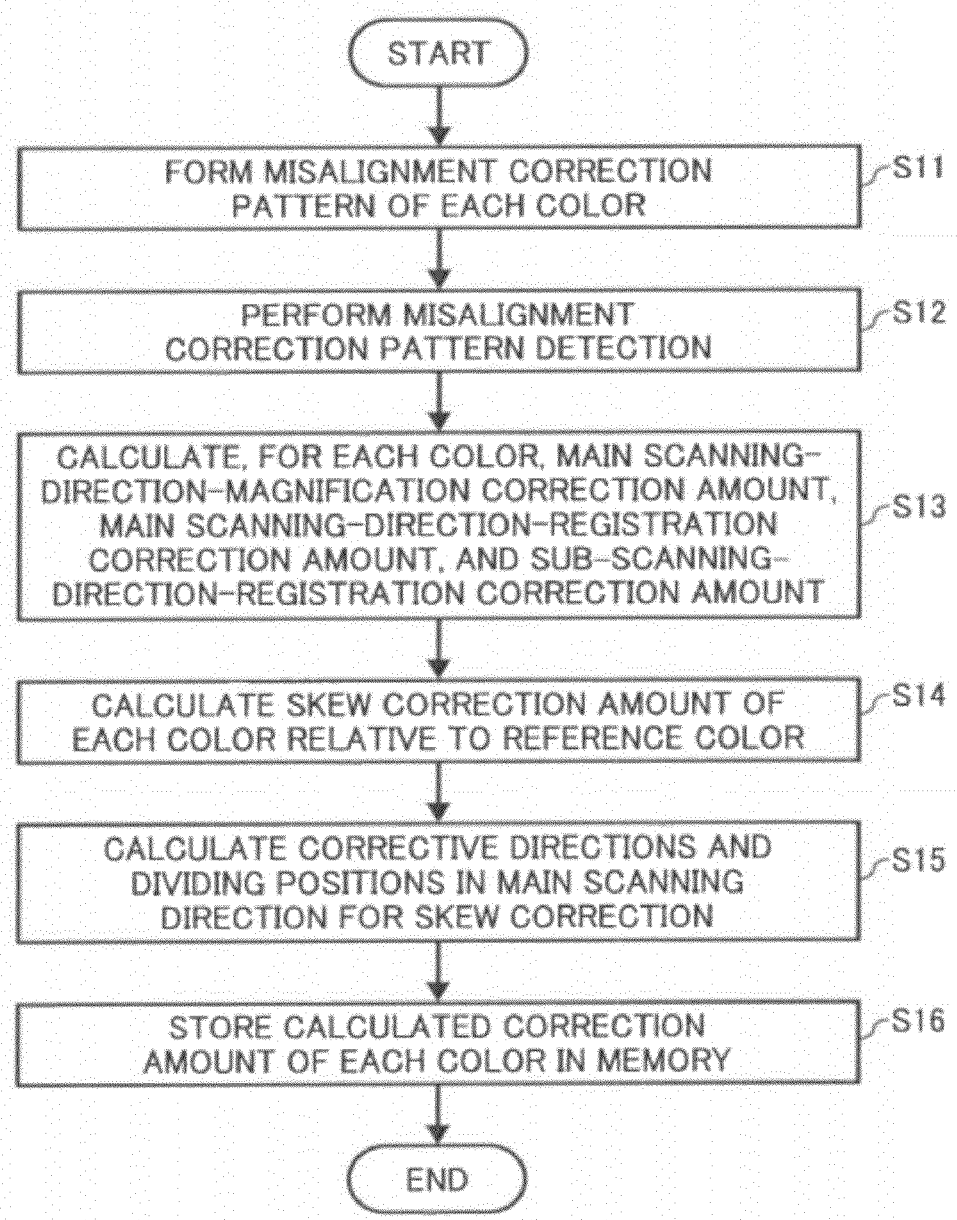
FIG. 5 is a flowchart of an exemplary method for calculating skew correction amounts.

A process of calculating the skew correction amounts will be described with reference to FIG. 5. FIG. 5 is a flowchart for explaining how the skew correction amounts are calculated. Misalignment correction will be described below on an assumption that the reference color is K. The reference color functions as a reference in color misalignment correction. Color-to-color misalignment is corrected by adjusting the other colors to the reference color.

When the write control unit 125 is commanded to start misalignment correction by the CPU 122, the write control unit 125 forms the correction patterns 14 on the transfer belt 3 (Step S11). The correction patterns 14 are created by the misalignment-correction-pattern creating units 132K, 132M, 132C, and 132Y in the write control units 126K, 126M, 126C, and 126Y shown in FIG. 4. The detection sensors 15 and 16 detect positions of the correction patterns 14, and output detection signals that indicate the positions of the correction patterns 14 to the pattern detecting unit 121 (Step S12).

The pattern detecting unit 121 receives the detection signals, converts them into digital data, and stores the digital data in the RAM 123. The CPU 122 calculates a main-scanning-direction-magnification correction amount, a main-scanning-direction-registration correction amount, and a sub-scanning-direction-registration correction amount of each color relative to the reference color (K) based on the positions of the correction patterns 14 according to the digital data stored in the RAM 123 (Step S13). The CPU 122 also calculates a skew correction amount of each color relative to the reference color (K) (Step S14). The CPU 122 then calculates correcting directions and dividing positions in the main-scanning direction for skew correction (Step S15).

The CPU 122 stores information that includes information about the main-scanning-direction magnification correction amounts, the main-scanning-direction registration correction amount, the sub-scanning-direction registration correction amount, the skew correction amounts, and the correcting directions and the dividing positions in the main-scanning direction for skew correction in the RAM 123 (or in a nonvolatile memory) (Step S16). Then, the process control ends. The correction amounts stored in the RAM 123 will be used as correction amounts for use in printing until a next calculation process of the correction amounts has been performed.

Figure 6:
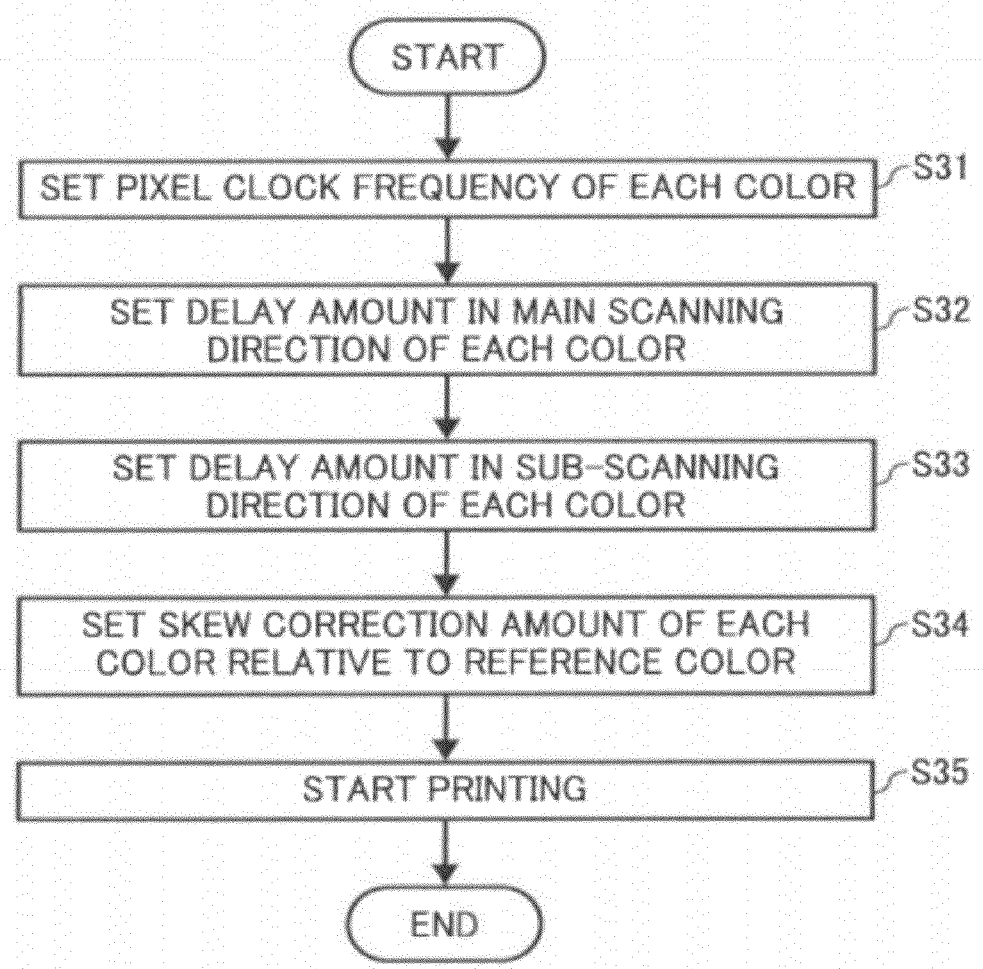
FIG. 6 is a flowchart of an exemplary method for printing implemented by the color copier shown in FIG. 1.

After the main-scanning-direction magnification correction amounts, the main-scanning-direction registration correction amounts, the sub-scanning-direction registration correction amounts, the skew correction amounts, and the correcting directions in the main-scanning direction and the dividing positions for skew correction of each color of M, C, and Y have been stored in the RAM 123 (or in the nonvolatile memory) as described above, a printing process is performed. FIG. 6 is a flowchart for explaining how printing is performed.

Upon receiving a print request from the CPU 122, the write control unit 125 sets a pixel clock frequency for each color of K, M, C, and Y based on the main-scanning-direction magnification correction amounts (Step S31). The write control unit 125 sets a delay amount in the main-scanning direction of each color (Step S32), and sets a delay amount in the sub-scanning direction of each color (Step S33).

The write control unit 125 sets a skew correction amount of each color of M, C, and Y relative to the reference color (K) based on the skew correction amount and information about the number of levels of each color (Step S34). The write control unit 125 starts printing while performing image correction for each color of K, M, C, and Y based on the set pixel clock frequencies, the delay amounts in the main-scanning direction, and the delay amount in the sub-scanning direction, and the skew correction amounts (Step S35). Then, the process control ends.

The main-scanning-direction misalignment is corrected by correcting the main-scanning-direction magnification and write-start timing in the main-scanning direction. The main-scanning-direction magnification error can be corrected by adjusting a picture frequency based on the main-scanning-direction magnification correction amount of each color calculated by the write control unit 125. The write control unit 125 includes a device, such as a clock generator that uses a voltage controlled oscillator (VCO), capable of setting a frequency finely. A counter in the main-scanning direction is triggered by a synchronization detection signal of each color. The write-start timing in the main-scanning direction is adjusted depending on a position on an output of the counter at which the LD starts output of data.

Figure 7:
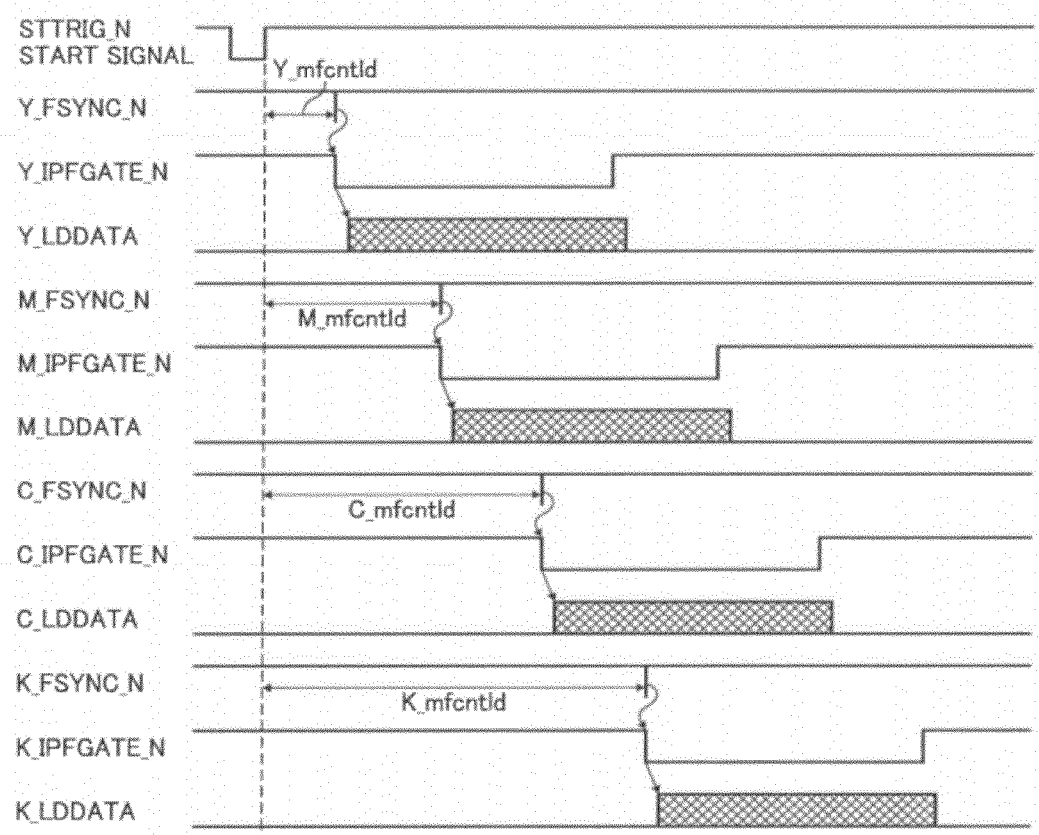
FIG. 7 is a timing chart for explaining write timing correction in the sub-scanning direction performed by the write control unit shown in FIG. 4.

The sub-scanning-direction misalignment is corrected by correcting write-start timing in the sub-scanning direction. FIG. 7 is a timing chart for explaining write timing correction in the sub-scanning direction performed by the write control unit 125. The write control unit 125 counts the number of lines in response to a start signal STTRIG_N that serves as a reference and outputs a sub-scanning timing signal (Y,M,C,K)_FSYNC_N to the image processing unit 124.

The sub-scanning timing signal (Y,M,C,K)_FSYNC_N triggers the image processing unit 124 to output the sub-scanning timing signal (Y,M,C,K)_FSYNC_N to the write control unit 125 and transfer the image data K_IPDATA [7:0]_N to the write control unit 125. The write control units 126K, 126M, 126C, and 126Y transmit the LD light-emission data (K,M,C,Y)_LDDATA to the LD control units 114K, 114M, 114C, and 114Y.

The sub-scanning-direction misregistration is corrected by adjusting sub-scanning delay amounts (Y,M,C,K)_mfcntld relative to the start signal according to the calculated misregistration amounts. It is general to perform alignment in the sub-scanning direction by adjusting timings (Y,M,C,K)_mfcntld while taking the sub-scanning delay amount of each color (M, C, and Y) relative to the reference color K into consideration.

Calculation of the misalignment amounts and correction of the misalignment will be described below. The detection sensors 15 and 16 detect the positions of the correction patterns 14 and output detection signals. The pattern detecting unit 121 converts the detection signals from analog data into digital data, which then undergoes sampling. The sampled digital data is stored in the RAM 123. After the procedure related to the detection of the correction patterns 14 is completed, the CPU 122 performs computations for calculations of the various misalignment amounts (the main-scanning-direction-magnification error amounts, the main-scanning direction misregistration amounts, the sub-scanning direction misregistration amounts, and the skew amounts). The CPU then calculates the correction amounts (the main-scanning-direction-magnification correction amounts, the main-scanning direction correction amounts, the sub-scanning direction correction amounts, and the skew correction amounts) of the misalignment components from the misalignment amounts.

Figure 8:
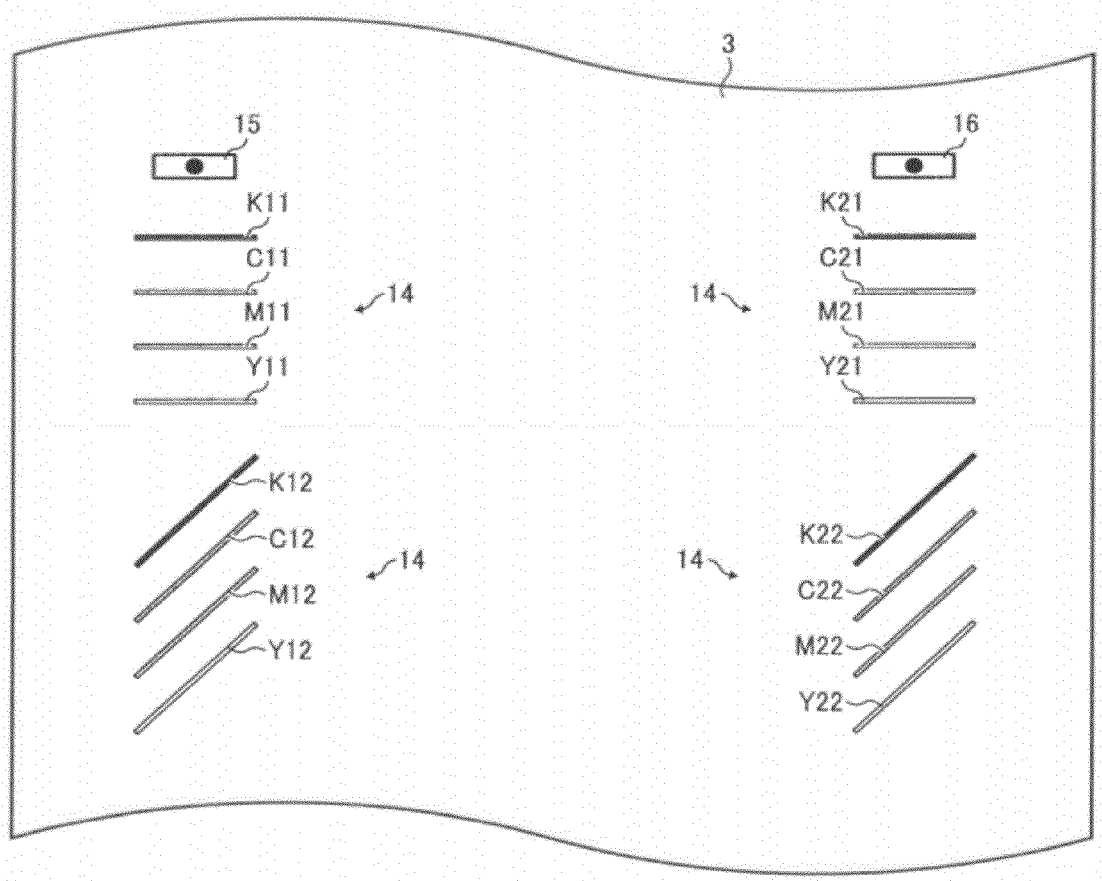
FIG. 8 is a schematic diagram of exemplary correction patterns formed on the transfer belt shown in FIG. 2.
Figure 9:
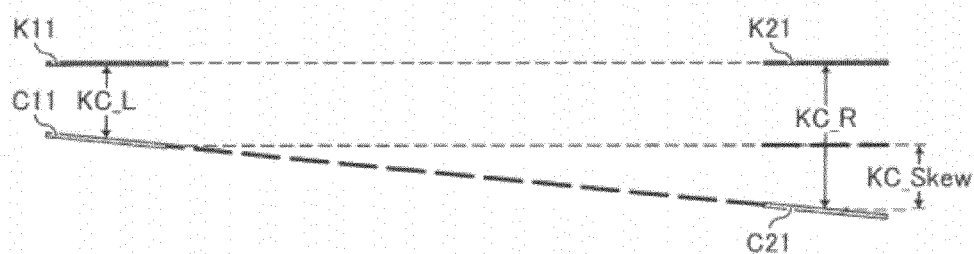
FIG. 9 is a schematic diagram for explaining a method of calculating a skew amount.

How to calculate the skew amounts and the skew correction amounts for use in the skew correction will be described in detail. FIG. 8 is a schematic diagram of exemplary correction patterns formed on the transfer belt 3. FIG. 9 is a schematic diagram for explaining a method of calculating a skew amount. FIG. 9 depicts an example of the method of calculating a skew amount of each color by using K as the reference color.

The CPU 122 calculates a skew amount of each color (M, C, and Y) relative to the reference color K. A state in which, as shown in FIG. 9, right sections of C-correction patterns (C11 and C21) of the correction patterns 14 are shifted downward as compared to those in a normal state will be described as an example. The detection sensor 15 on the left side in FIG. 9 detects positions of some (K11 and C11) of left sections of the correction patterns 14 and calculates KC_L, which is a distance between the left section of the K-correction pattern and that of the C-correction pattern based on a relationship between the detected positions. The detection sensor 16 on the right side in FIG. 9 detects positions of some (K21 and C21) of right sections of the correction patterns 14 and calculates KC_R, which is a distance between the right section of the K-correction pattern and that of the C-correction pattern based on a relationship between the detected positions. Hence, KC_Skew, which is a C-skew amount relative to K, is calculated by using Equation (1):

$$KC\_Skew = KC\_R - KC\_L \quad (1)$$

KM_Skew, which is an M-skew amount relative to K, and KY_Skew, which is a Y-skew amount relative to K, can be similarly calculated by detecting the positions of the correction patterns 14 and by using Equations (2) and (3), respectively:

$$KM\_Skew = KM\_R - KM\_L \quad (2)$$

$$KY\_Skew = KY\_R - KY\_L \quad (3)$$

KC_Skew, which is the C-skew amount, KM_Skew, which is the M-skew amount, and KY_Skew, which is the Y-skew amount, relative to K can be calculated as described above.

Calculation of a skew correction amount based on the skew amounts will be described below by way of an example. FIG. 10 is a table of exemplary skew amounts relative to the reference color K for a resolution of 600 dots per inch (dpi) in the sub-scanning direction. It is assumed that the skew amount of each color is calculated as shown in FIG. 10 by using Equations (1) to (3). More specifically, it is assumed that the skew amount of each color are such that the M-skew amount is −110 micromillimeters, the C-skew amount is −130 micromillimeters, and the Y-skew amount is 30 micromillimeters. Because the resolution in the sub-scanning direction is 600 dpi, shifting by one line corresponds in distance to a displacement of 42.3 micromillimeters that is obtained by dividing 25,400 micromillimeters by 600. Hence, the screw correction amount can be calculated by dividing the skew amount of each color by the displacement distance for one-line shifting, rounding off the quotient to the number of decimal, and inverting the sign of the value. FIG. 11 is a table of exemplary skew correction amounts obtained from the skew amounts of FIG. 10. As shown in FIG. 11, the M-skew correction amount is +3 lines, the C-skew correction amount is +3 lines, and the Y-skew correction amount is −1 line.

An example of the skew correction method performed by the skew-correction processing unit 135 will be described with reference to FIGS. 12 to 17. FIGS. 12 to 16 are schematic diagrams for explaining the example of the skew correction method. FIG. 12 is a schematic diagram depicting eight lines of image data. One line of the image data corresponds to image data stored in a single line memory. FIG. 13 is a schematic diagram of an output image that is obtained by outputting image data of the input image shown in FIG. 12 as LD light-emission data without performing the skew correction. When the image data is output as the LD light-emission data without being subjected to the skew correction, skew of a scanning beam causes a right side of an output image on a sheet to be deviated upward by three lines as compared with the input image shown in FIG. 12. In other words, the skew correction amount for the image shown in FIG. 13 is three lines.

When, as in this case, a right side of an output image of image data is undesirably deviated upward by three lines, the skew-correction processing units 135M, 135C, and 135Y divide pixels that belong to (represent) one line of the image data in the main-scanning direction into equal blocks. It is assumed here that one line of the image data in the main-scanning direction has total 4800 pixels from 1st pixel to 4,800th pixel. More specifically, the skew-correction processing unit 135 divides the pixels into {(the number of lines of the skew correction amount)+1} equal blocks. It is assumed that the pixels are divided into four equal blocks as shown in FIG. 14. Each of the positions (dividing position) where the pixels on the line in the main scanning direction are divided is denoted as a "shift position", and each of regions that are defined by dividing at the shift positions on the line in the main-scanning direction is denoted as a shift region. As shown in FIG. 14, thus, there are five shift positions of 0, 1200, 2400, 3600, and 4800.

As shown in FIG. 15, the skew-correction processing units 135M, 135C, and 135Y cause the pixels divided at the shift positions to shift such that a shift region is shifted downward by one line than a left-neighboring shift region for each of the shift regions. This downward direction shift is performed in order to compensate for the skew in the sub-scanning direction. In this manner, the skew-correction processing units 135M, 135C, and 135Y correct the skew of the output image on the sheet as shown in FIG. 16.

More specifically, a portion of the image data is stored in each of the line memories 128M, 128C, and 128Y in a sequential manner. That portion of the image data is read out from the line memory 128 for each of the shift regions defined by the dividing at the shift positions. By selectively changing the line memory 128, it is possible to obtain the output image shown in FIG. 16.

Hence, as shown in FIG. 17, the skew-correction processing unit 135 calculates shift positions and shift directions (+ve or −ve) in the sub-scanning direction at the shift positions based on the skew correction amounts calculated by the CPU 122. The shift position is an address of the corresponding line memory. The shift positions and the shift directions are referred to as shift correction information. The skew-correction processing unit 135 causes the pixels (shift regions) divided in the main-scanning direction at the shift positions to shift in the shift directions, thereby performing color-to-color skew correction. FIG. 17 is a table of exemplary shift positions and shift directions calculated by the skew-correction processing unit 135.

Another example of the skew correction method performed by the skew-correction processing unit 135 will be described with reference to FIGS. 18 to 23. FIGS. 18 to 23 are schematic diagrams for explaining the other example of the skew correction method. FIG. 18 is a schematic diagram depicting eight lines of image data. FIG. 19 is an output image that is obtained by outputting image data pertaining to an input image shown in FIG. 18 as LD light-emission data without performing the skew correction. When the image data is output as the LD light-emission data without being subjected to the skew correction, skew of a scanning beam causes a right side of an output image on a sheet to be shifted downward by one line as compared with the input image shown in FIG. 18. In other words, the skew correction amount is one line. This skew can also be corrected by performing similar operations as described above with reference to FIGS. 12 to 17.

More specifically, when a right side of an output of image data is undesirably deviated downward by one line, the skew-correction processing units 135M, 135C, and 135Y divide 4,800 pixels that belong to one line of the image data in the main-scanning direction into equal blocks. More specifically, the skew-correction processing unit 135 divides the pixels into {(the number of lines of the skew correction amount)+1} equal blocks. It is assumed that the pixels are divided into two equal blocks as shown in FIG. 20. As shown in FIG. 21, the skew-correction processing units 135M, 135C, and 135Y cause the pixels divided at the shift position to shift such that a shift region is shifted upward by one line than a left-neighboring shift region for each of the shift regions. In this manner, the skew-correction processing units 135M, 135C, and 135Y correct the skew of the output image on the sheet as shown in FIG. 22.

More specifically, a portion of the image data is stored in each of the line memories 128M, 128C, and 128Y in a sequential manner. That portion of the image data is read out from the line memory 128 for each of the shift regions defined by the dividing at the shift positions. By selectively changing the line memory 128, it is possible to obtain the output image shown in FIG. 22.

Hence, as shown in FIG. 23, the skew-correction processing unit 135 calculates shift position and shift direction (+ve or −ve) in the sub-scanning direction at the shift positions based on the skew correction amounts calculated by the CPU 122. The shift position is an address of the corresponding line memory. The shift positions and the shift directions are referred to as shift correction information. The skew-correction processing unit 135 causes the pixels (shift region) divided in the main-scanning direction at the shift position to shift in the shift directions, thereby performing color-to-color skew correction. Information including the address of the shift position in the main-scanning direction and the shift direction (+ve or −ve) in the sub-scanning direction at the shift position is denoted as shift correction information.

The shift correction information is stored in the RAM 123. The shift correction information is obtained based on the skew correction amounts calculated by the CPU 122. The skew-correction processing unit 135 retrieves the shift correction information from the RAM 123 for each skew correction and performs the skew correction based on the shift correction information. The skew-correction processing unit 135 updates the shift correction information when a new piece of the shift correction information is obtained.

Assume that, for example, image data in the main-scanning direction is represented by 4,800 pixels as shown in FIG. 14. Because the pixels on the right end are deviated upward by three lines relative to the pixels on the left end, the skew-correction processing unit 135 divides the 4,800 pixels that belong to one line of image data in the main-scanning direction into four equal blocks. More specifically, the skew-correction processing unit 135 divides the pixels into a shift region of the 1st to 1,200th pixels, that of the 1,201st to 2,400th pixels, that of the 2,401st to 3,600th pixels, and that of the 3,601st to 4,800th pixels. In the following description, these shift regions are denoted as a first block, a second block, a third block, and a fourth block, respectively.

The numbers 1 to 8 in FIG. 14 indicate the ordinal numbers of the eight lines. As shown in FIG. 15, for the 1st to 1,200th pixels of the first line, the skew-correction processing unit 135 outputs the first block of the image data in the line memory for the first line and outputs white pixels for the 1,201st to 4,800th pixels. For the 1st to 1,200th pixels of the second line, the skew-correction processing unit 135 outputs the first block of the image data in the line memory for the second line. For the 1,201st to 2,400th pixels of the second line, the skew-correction processing unit 135 outputs the second block of the image data in the line memory for the first line, and outputs white pixels for the 2,401st to 4,800th pixels of the second line. By repeating an image-data output process in this manner, the skew-correction processing unit 135 corrects the skew of an output image on a sheet as shown in FIG. 16.

Figure 24:
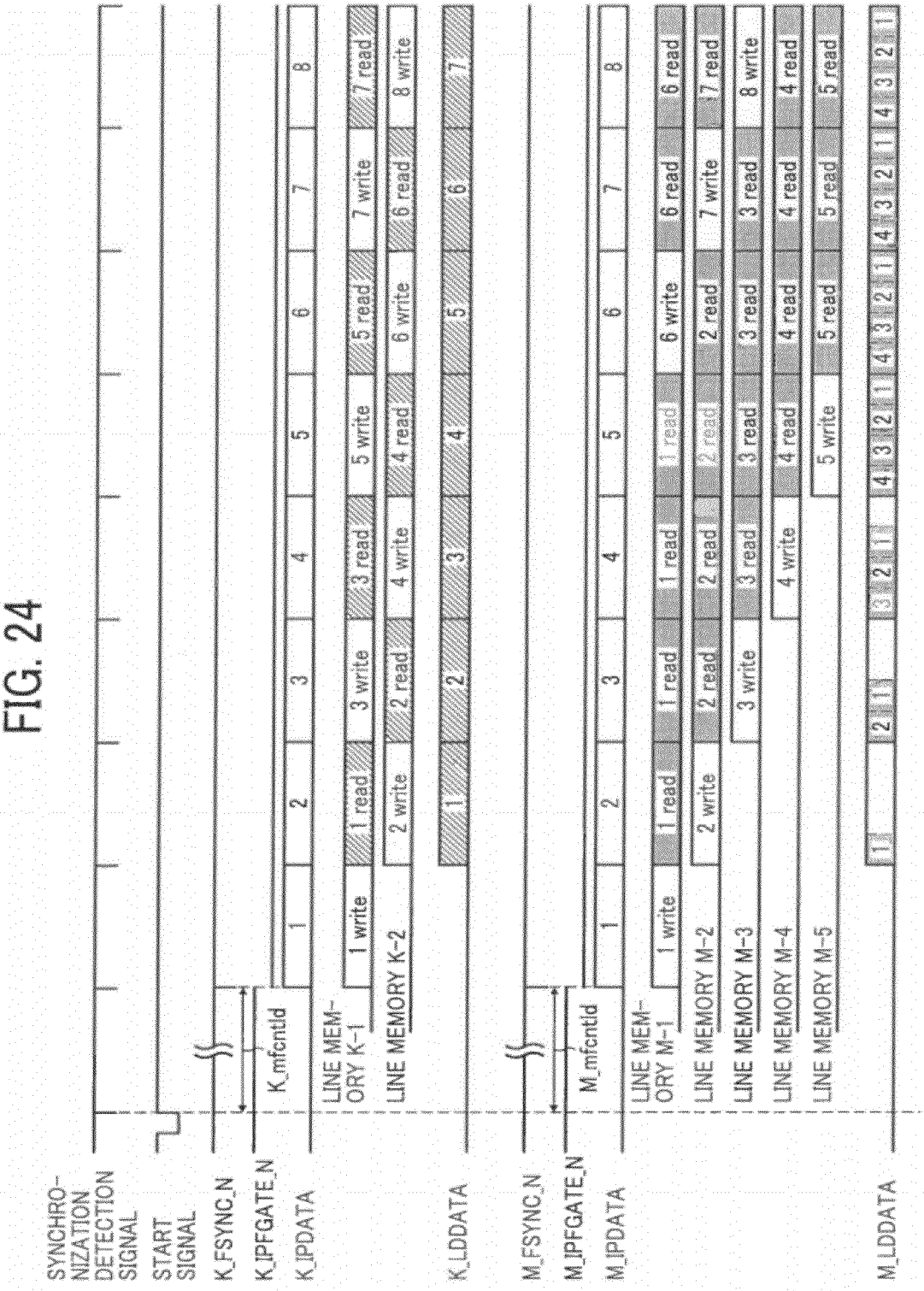
FIGS. 24 and 25 depict a timing chart of read/write timings for reading and writing in the sub-scanning direction performed by the write control unit shown in FIG. 4 during skew correction.
Figure 25:
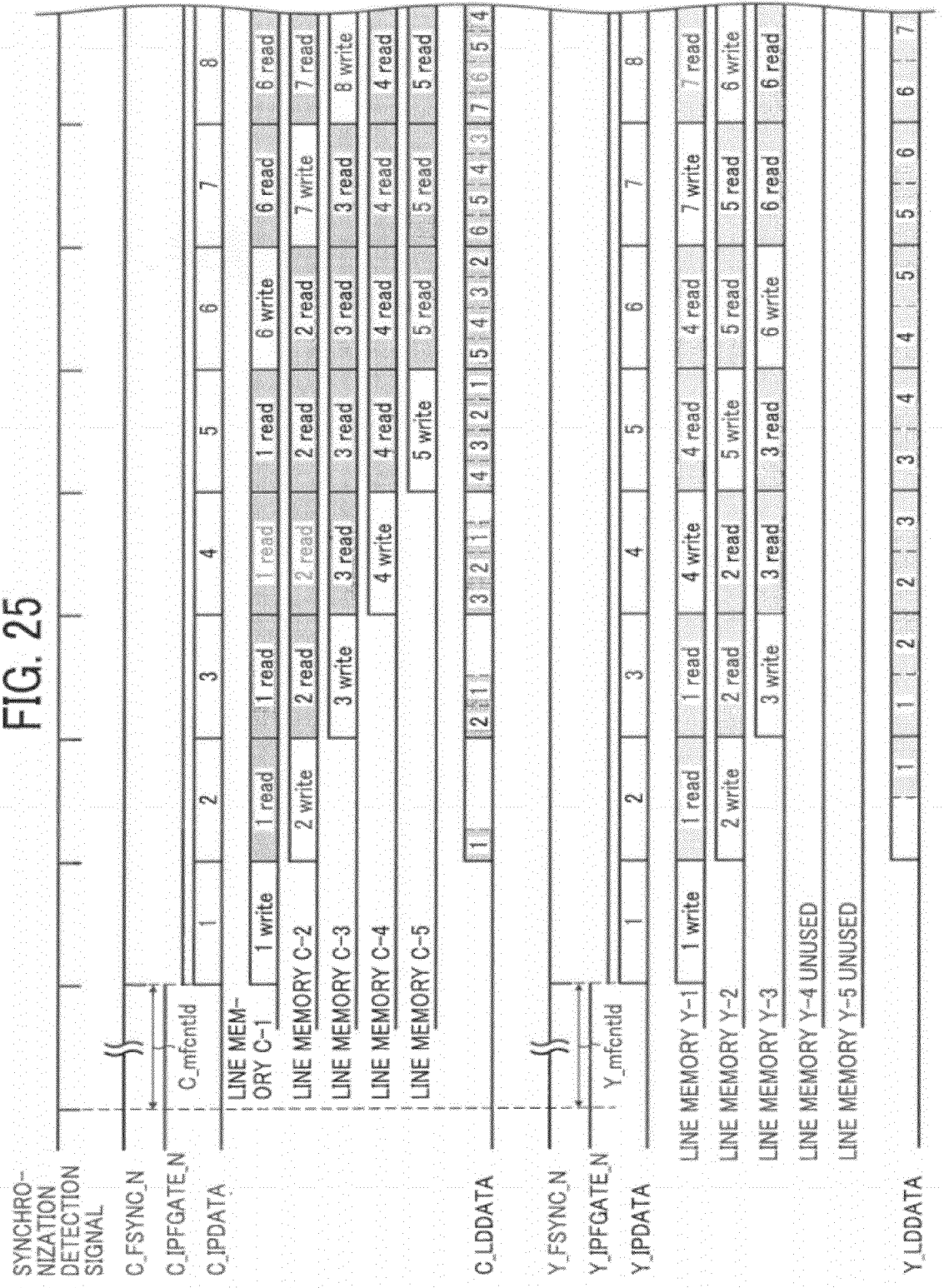

FIGS. 24 and 25 are timing charts of read/write timings for reading and writing performed by the write control unit 125 in the sub-scanning direction. It is assumed that because K is the reference color, dividing for the K-image is not performed. A skew correction amount for each of M and C is three lines, and a skew correction amount for Y is one line. Accordingly, for each of M and C, three shift regions of equally-divided four shift regions are shifted in the shift direction, while for Y, one shift region of equally-divided two shift regions is shifted in the shift direction.

The input-image control unit 127 starts a printing operation after a sub-scanning delay (K,M,C,Y)_mfcntld from the start signal STTRIG_N. When printing is started, the input-image control unit 127 stores image data in line memories K-1, M-1, C-1, and Y-1.

Subsequently, the input-image control unit 127 stores image data in line memories K-2, M-2, C-2, and Y-2, and simultaneously reads from the line memories K-1, M-1, C-1, and Y-1 the image data stored therein. The write control unit 126K causes all pixels of the line memory K-1 to be output to the K-LD light-emission data K_LDDATA. The write control unit 126M causes pixels of the first block of the equally-divided four shift regions of the line memory M-1 to be output to M-LD light-emission data M_LDDATA. The write control unit 126C causes pixels of the first block of the equally-divided four shift regions of the line memory C-1 to be output to C-LD light-emission data C_LDDATA. The write control unit 126Y causes pixels of the first block of the equally-divided two shift regions of the line memory Y-1 to be output to Y-LD light-emission data Y_LDDATA.

The input-image control units 127K, 127M, 127C, and 127Y store image data in line memories K-3, M-3, C-3, and Y-3, and simultaneously reads from the line memories K-2, M-1, M-2, C-1, C-2, Y-1, and Y-2 the image data stored therein. The write control unit 126K causes all pixels of the line memory K-2 to be output to the K-LD light-emission data K_LDDATA. The write control unit 126M causes pixels of the second block of the line memory M-1 and pixels of the first block of the line memory M-2 to be output to the M-LD light-emission data M_LDDATA. The write control unit 126C causes pixels of the second block of the line memory C-1 and pixels of the first block of the line memory C-2 to be output to the C-LD light-emission data C_LDDATA. The write control unit 126Y causes pixels of the second block of the line memory Y-1 and pixels of the first block of the line memory Y-2 to be output to the Y-LD light-emission data Y_LDDATA.

The input-image control units 127K, 127M, 127C, and 127Y store image data in line memories K-4, M-4, C-4, and Y-1, and simultaneously reads from the line memories K-1, M-1, M-2, M-3, C-1, C-2, C-3, Y-2, and Y-3 the image data stored therein. The write control unit 126K causes all pixels of the line memory K-3 to be output to the K-LD light-emission data K_LDDATA. The write control unit 126M causes pixels of the third block of the line memory M-1, pixels of the second block of the line memory M-2, and pixels of the first block of the line memory M-3 to be output to the M-LD light-emission data M_LDDATA. The write control unit 126C causes pixels of the third block of the line memory C-1, pixels of the second block of the line memory C-2, and pixels of the first block of the line memory C-3 to be output to the C-LD light-emission data C_LDDATA. The write control unit 126Y causes pixels of the second block of the line memory Y-2 and pixels of the first block of the line memory Y-3 to be output to the Y-LD light-emission data Y_LDDATA.

The input-image control units 127K, 127M, 127C, and 127Y store image data in line memories K-5, M-5, C-5, and Y-2, and simultaneously reads from the line memories K-2, M-1, M-2, M-3, M-4, C-1, C-2, C-3, C-4, Y-1, and Y-3 the image data stored therein. The write control unit 126K causes all pixels of the line memory K-4 to be output to the K-LD light-emission data K_LDDATA. The write control unit 126M causes pixels of the fourth block of the line memory M-1, pixels of the third block of the line memory M-2, pixels of the second block of the line memory M-3, and pixels of the first block of the line memory M-4 to be output to the M-LD light-emission data M_LDDATA. The write control unit 126C causes pixels of the fourth block of the line memory C-1, pixels of the third block of the line memory C-2, pixels of the second block of the line memory C-3, and pixels of the first block of the line memory C-4 to be output to the C-LD light-emission data C_LDDATA. The write control unit 126Y causes pixels of the second block of the line memory Y-3 and pixels of the first block of the line memory Y-4 to be output to the Y-LD light-emission data Y_LDDATA. The above procedure is repeatedly performed, and printing of the skew-corrected image data is performed.

In the skew correction described above, the pixels that belong to one line of image data in the main-scanning direction are divided into a plurality of blocks. Dividing one line of image data in a plurality of blocks, however, can change relationship between adjacent pixels on each of the shift positions leading to a local color density change at the shift position, i.e., density shift. This density shift is particularly noticeable in an image processed by a digital halftoning method such as dither. Because local color density change occurs at a shift position in a dithered image at regular intervals in the sub-scanning direction, density shift is particularly noticeable in the dithered image.

Why performing the skew correction on a dithered image data can result in density shift will be described below. A color MFP such as a color laser printer includes different dither matrices for smooth tone transition. The dither matrices differ from one another for different colors, for each of a photo mode and a character mode, for different classes of the number of bits, for different levels of resolutions, and the like. The dither matrices differ from one another in size and shape in many cases.

Dithering is a method of converting a multi-level image into a binary image. This binarization is performed by applying a matrix, what is called dither matrix, of threshold values of N×M pixels (both N and M are positive integers) to an original, multi-level image. Each pixel (dither matrix size) is so small that the obtained binary image is perceived as being a gray-level image. Thus, dithering is a technique of simulating multiple tones by using binary values. A multi-level dither method of obtaining a multi-level image by setting the number of levels of resultant dithered images to 3 to 16 rather than 2 can also be used. A binary image will be described below as an example; however, the present invention is applicable to multiple-level images as well.

In electrophotographic recording, because the diameter of a laser beam is greater than the size of a pixel, a toner area coverage of each pixel is greater than the size of the pixel on an actually recorded image (toner image on printing paper). When the shifting for skew correction (hereinafter, "corrective shifting") is performed, an area where toner overlaps (hereinafter, "toner-overlapping area") can increase or decrease at a shift position. Accordingly, a toner area coverage can decrease or increase at the shift position.

For example, in a case where a toner area coverage increases (i.e., a toner-overlapping area of pixels representing image data decreases) by corrective shifting, a local color density on or in the vicinity of a shift position increases. In contrast, in a case where a toner area coverage decreases (i.e., toner-overlapping area of pixels representing image data increases) by corrective shifting, a local color density on or in the vicinity of a shift position decreases. Because this change in toner area coverage occurs only at the shift position, an image in the vicinity of the shift position can be degraded by the corrective shifting. In particular, in a digitally-halftoned image such as a dithered image, when the toner area coverage is changed at a number of positions, the corrective shifting can result in banding noise extending in the sub-scanning direction.

Figure 26:
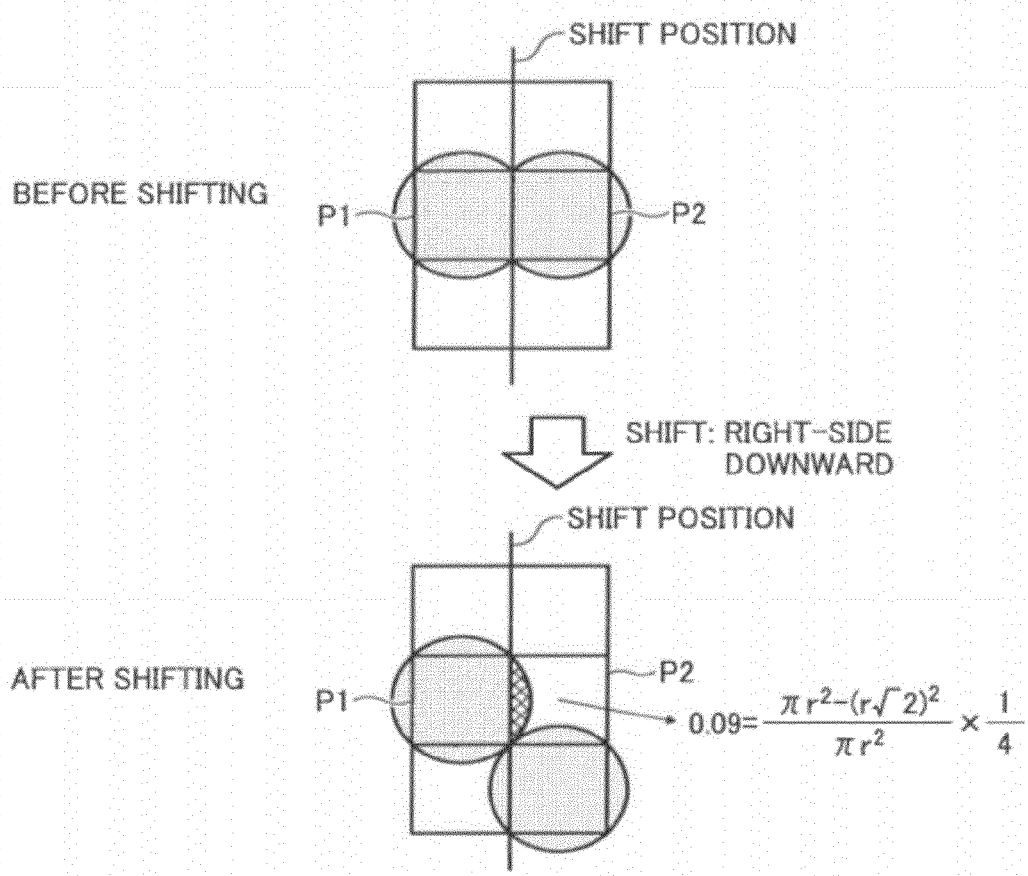
FIG. 26 is a schematic diagram of a pixel of which toner area coverage is changed by corrective shifting.

An exemplary case where corrective shifting results in an increase or decrease of a toner area coverage will be described specifically. FIG. 26 is a schematic explanatory diagram of an example of a pixel of which toner area coverage is changed by corrective shifting.

The corrective shifting in the sub-scanning direction is performed on a line-by-line basis. Accordingly, the corrective shifting causes one of two adjacent pixels, which are adjacent to each other with the shift position therebetween, to be shifted in the sub-scanning direction by one pixel. Hence, relationship between the adjacent pixels with the shift position therebetween can be changed by the corrective shifting in the sub-scanning direction. FIG. 26 depicts that before corrective shifting, both a pixel P1 and its neighboring pixel P2 are black pixels. However, the pixel P2 adjacent to the pixel P1 is changed to a white pixel after the corrective shifting. When such an image in which a pixel adjacent to a certain pixel is changed is output, as shown in a bottom diagram of FIG. 26 depicting pixels after the corrective shifting, a toner area coverage is changed by an area depicted as a cross-hatched area.

Assume that, for example, the toner area coverage within the pixel P1 is 1. After corrective shifting downward in the sub-scanning direction is performed at the shift position, the pixel P1 and the pixel P2 do not have toner-overlapping area, which has been present before the corrective shifting, therebetween any more. As a result, the toner area coverage increases by 0.09. Such an increase in toner area coverage is particularly likely to occur at regular intervals in the sub-scanning direction in pixels that represent digitally-halftoned image data and that are on a shift position. Such an increase results in black banding noise that degrades image quality.

In contrast, although not shown, when a toner-overlapping area is created by corrective shifting, the toner area coverage decreases by 0.09. The toner area coverage is calculated from the equation shown in FIG. 26. Such a decrease in toner area coverage is particularly likely to occur at regular intervals in the sub-scanning direction in pixels that represent digitally-halftoned image data and that are on a shift position. Such a decrease can result in white banding noise that degrades image quality.

The corrective shifting can reduce misalignment due to skew or curve; however, the corrective shifting can disadvantageously result in banding noise on an output image of digitally-halftoned image data, in particular. To this end, the skew-correction processing units 135M, 135C, and 135Y of the first embodiment not only perform the corrective shifting but also compensate a change in density resulting from the corrective shifting. The skew-correction processing units 135M, 135C, and 135Y will be described in detail below.

Figure 27:
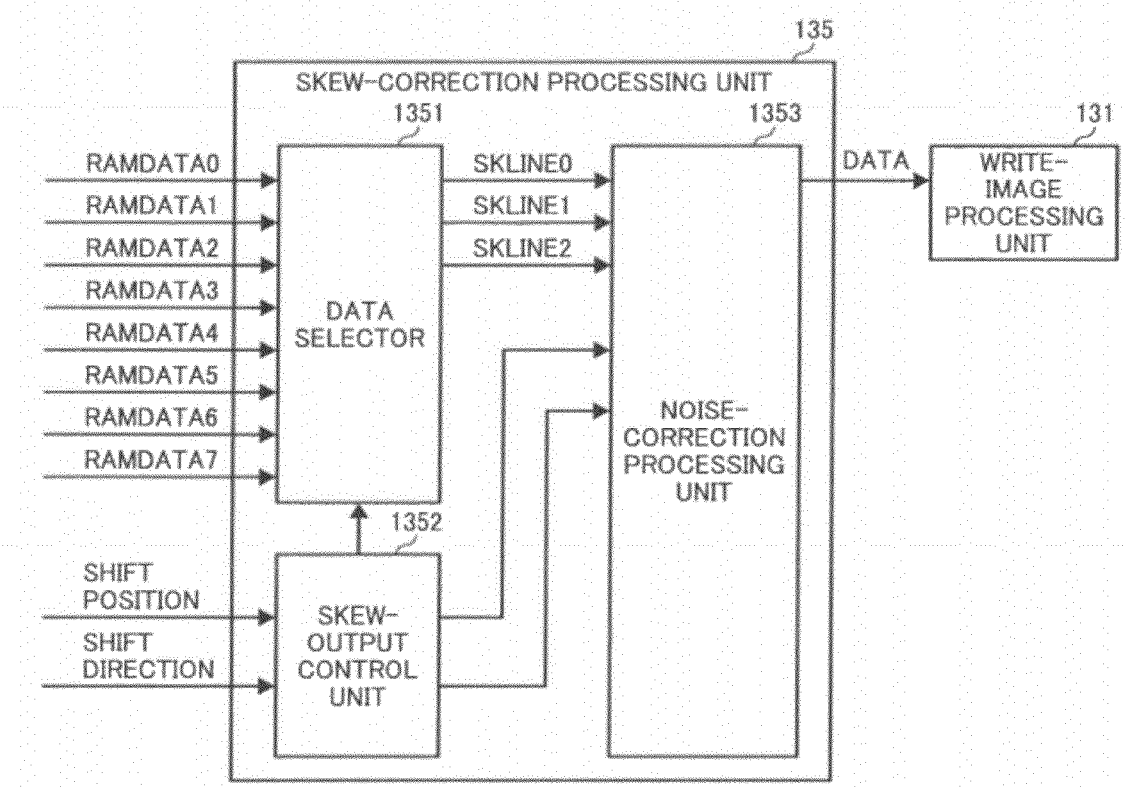
FIG. 27 is a block diagram of a skew-correction processing unit according to the first embodiment.

FIG. 27 is a detailed block diagram of the skew-correction processing unit 135. The skew-correction processing unit 135 can be any one of the skew-correction processing units 135M, 135C, and 135Y. The skew-correction processing unit 135 includes a data selector 1351, a skew-output control unit 1352, and a noise-correction processing unit 1353.

The skew-output control unit 1352 retrieves the shift correction information (information about the shift position and the shift direction) from the RAM 123, and outputs a selection signal for selecting image data to be output based on the shift correction information. The image data to be output is selected from image data stored in the line memory 128M by designating one of the lines of the line memory 128M. The skew-output control unit 1352 outputs the shift correction information to the noise-correction processing unit 1353.

The data selector 1351 selects the image data of the designated line to be output from the image data having been read from the line memory 128M by the input-image control unit 127M based on the selection signal output from the skew-output control unit 1352. The data selector 1351 outputs the selected image data to the noise-correction processing unit 1353. More specifically, in the first embodiment, the data selector 1351 outputs, in addition to the image data of the designated line, image data of the line immediately above the designated line and that of the line immediately below the designated line (image data pertaining to these three lines in total) to the noise-correction processing unit 1353. In the first embodiment, the three lines of image data (hereinafter, "three-line image data") is output to the noise-correction processing unit 1353; however, the image data to be output to the noise-correction processing unit 1353 is not limited thereto. For example, image data corresponding to more than three lines can be output to the noise-correction processing unit 1353 depending on processing performed by the noise-correction processing unit 1353.

The noise-correction processing unit 1353 receives the shift correction information from the skew-output control unit 1352 and the image data from the data selector 1351. The noise-correction processing unit 1353 extracts, from the image data, one or more pixels at a position where noise is determined to occur in the vicinity of the shift position. The noise-correction processing unit 1353 corrects a color density of image data represented by the extracted pixel to prevent noise, and outputs the color-density-corrected image data to the write-image processing unit 131.

Figure 28:
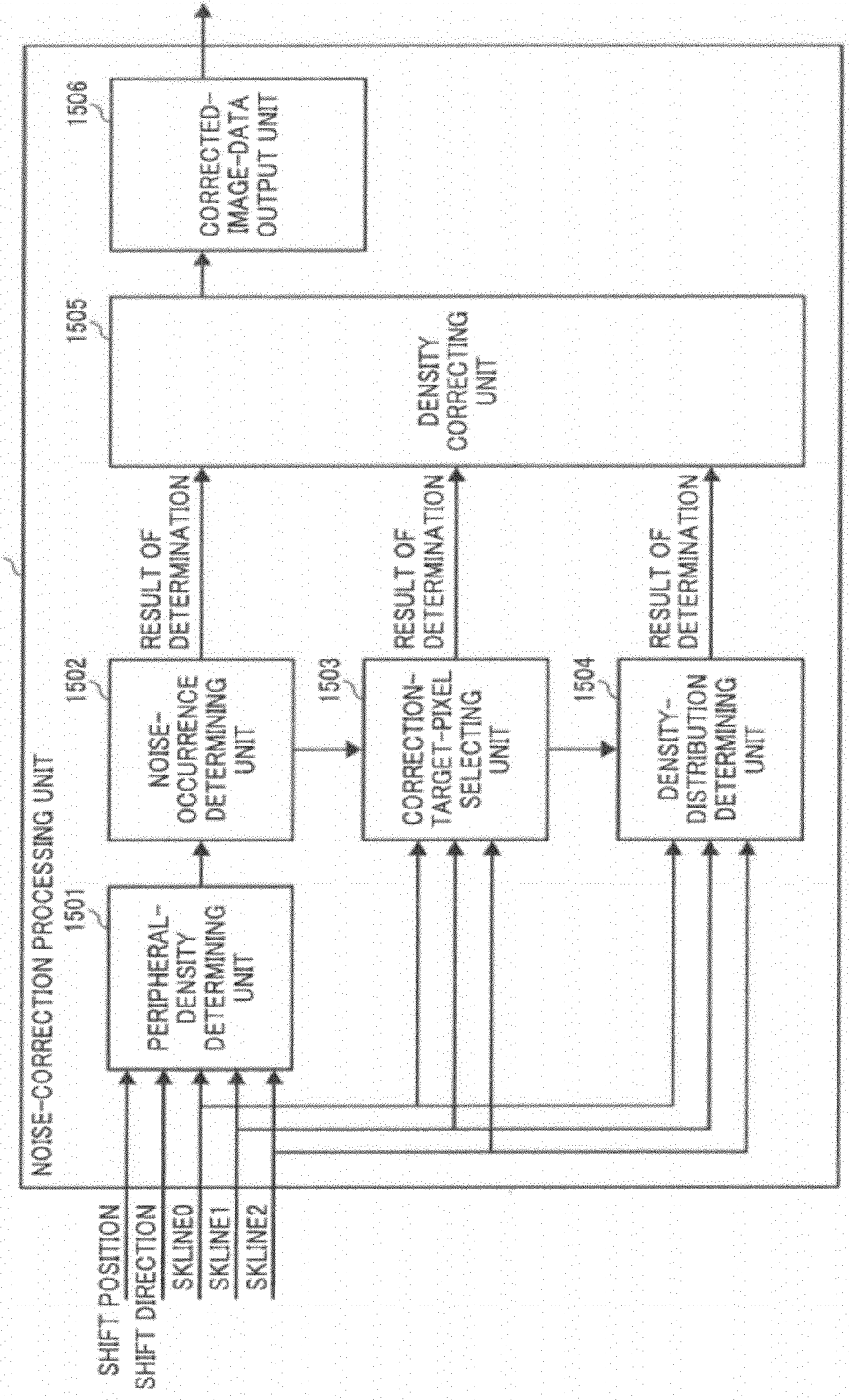
FIG. 28 is a block diagram of a noise-correction processing unit of the skew-correction processing unit shown in FIG. 27.
Figure 29:
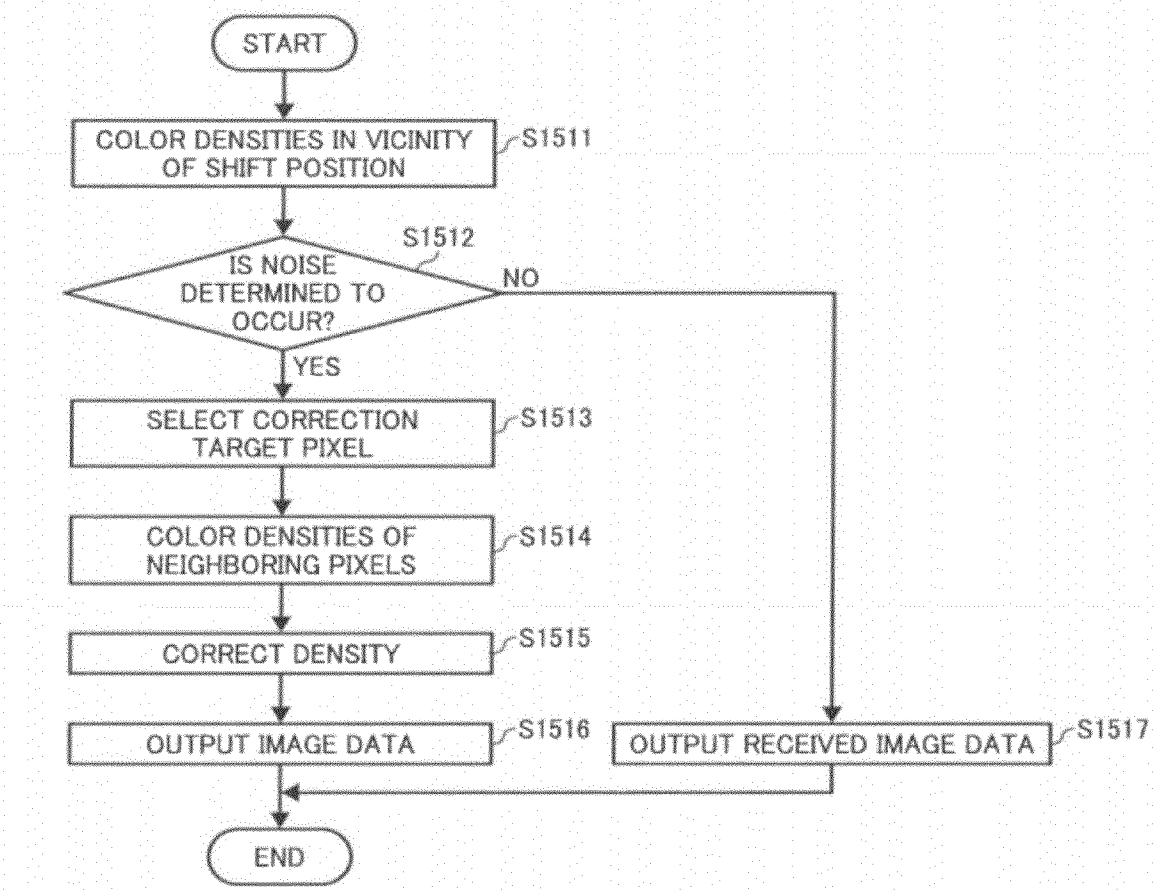
FIG. 29 is a flowchart for explaining how the noise-correction processing unit shown in FIG. 29 corrects color density of image data.

The configuration and process control of the noise-correction processing unit 1353 according to the first embodiment will be described with reference to FIGS. 28 and 29. FIG. 28 is a block diagram of the noise-correction processing unit 1353 according to the first embodiment. FIG. 29 is a flowchart depicting how density correction of image data is performed by the noise-correction processing unit 1353.

The noise-correction processing unit 1353 includes a peripheral-density determining unit 1501, a noise-occurrence determining unit 1502, a correction-target-pixel selecting unit 1503, a density-distribution determining unit 1504, a density correcting unit 1505, and a corrected-image-data output unit 1506. The peripheral-density determining unit 1501 determines color densities of peripheral pixels that are in the vicinity of the shift position. Each of the noise-correction processing unit for Y, M, and C has the similar configuration with that of the noise-correction processing unit 1353 shown in FIG. 28.

The peripheral-density determining unit 1501 receives the shift correction information from the skew-output control unit 1352 and the three-line image data from the data selector 1351. The peripheral-density determining unit 1501 determines color densities of image data represented by peripheral pixels that are in the vicinity of the shift position, which is a portion of the three-line image data (Step S1511). In the first embodiment, the peripheral-density determining unit 1501 determines color densities of the image data represented by three lines×two pixels on the shift position. The shift correction information includes information about the shift position.

More specifically, the peripheral-density determining unit 1501 stores the image data represented by the three lines×two pixels on the shift position, which is the portion of the three-line image data, in a register, and determines color densities pertaining to the image data stored in the register. For example, assume that the input-image control unit 127 receives 1-bit binary image data that represents image with a density value 0 or 15 and converts the binary image data into 4-bit image data that represents image with density values ranging from 0 to 15. In this case, the peripheral-density determining unit 1501 determines the density as a value ranging from 0 to 15.

The noise-occurrence determining unit 1502 determines whether a pixel of interest on the shift position is a noise-inducing pixel based on the color densities of the image data represented by the peripheral pixels and the shift determined by the peripheral-density determining unit 1501 and a shift direction (Step S1512). The pixel of interest corresponds to each pixel on the shift position. The noise-inducing pixel is such a pixel that leads to an increase or decrease of a local color density because of a change in relationship with an adjacent pixel of the noise-inducing pixel. The shift direction is specified based on a line, of the line memory 128, from which a pixel that is preceding and adjacent to the pixel of interest in the main-scanning direction is output. This is because when corrective shifting is performed, the pixel of interest and its preceding pixel at the shift position are output from different lines of the line memory 128.

Figure 30:
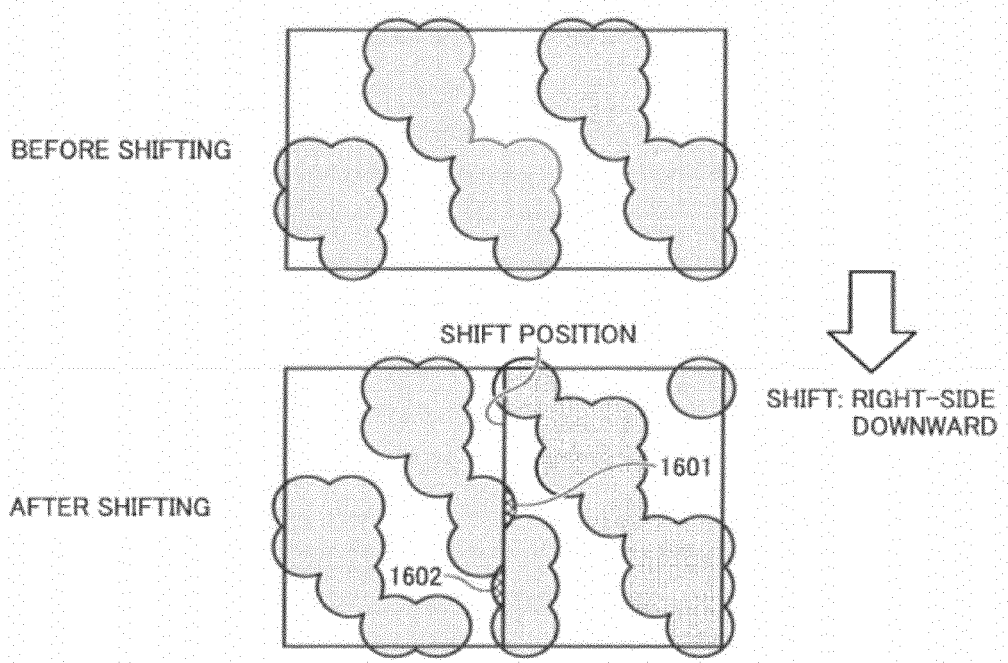
FIG. 30 is a schematic diagram for explaining how a pixel of interest on a shift position becomes a noise-inducing pixel by way of an example.

FIG. 30 is a schematic diagram for explaining how a pixel of interest that is on a shift position becomes a noise-inducing pixel by way of an example. Because a right section of the image is shifted downward in this example, a color density of image data represented by a pixel-of-interest 1601 and a pixel-of-interest 1602 both on the shift position changes to 0 which is a density value for white pixels. Because a toner area coverage indicated as cross-hatched areas in FIG. 30 hence increases, the noise-occurrence determining unit 1502 determines that the pixel-of-interest 1601 and the pixel-of-interest 1602 are noise-inducing pixels.

Figure 31:
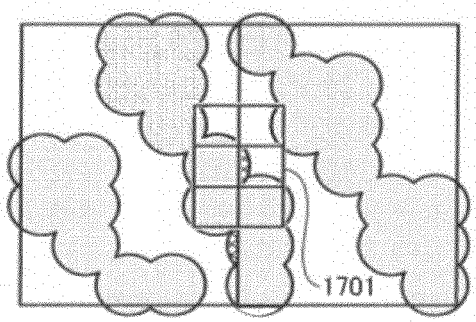
FIG. 31 is a schematic diagram of an example of pixels in the vicinity of a shift position.
Figure 32:
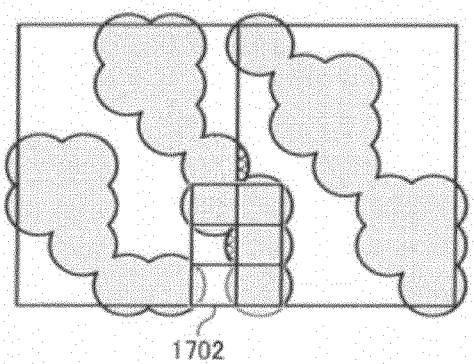
FIG. 32 is a schematic diagram of an example of pixels in the vicinity of the shift position.

In the first embodiment, the noise-occurrence determining unit 1502 determines a pixel of interest as being a noise-inducing pixel when a pixel arrangement and a shift direction of pixels in the vicinity of the shift position match a preset pixel arrangement pattern. This pixel arrangement pattern is such a pattern that when corrective shifting of image data that matches the pixel arrangement pattern is performed, a toner area coverage increases or decreases, resulting in a local increase or decrease of density on an output of the image data. FIGS. 31 and 32 are schematic diagrams of examples of pixels in the vicinity of a shift position. When corrective shifting as shown in FIG. 30 is performed, the noise-occurrence determining unit 1502 determines whether a pixel of interest is a noise-inducing pixel by comparing a pixel arrangement 1701 of three lines×two pixels shown in FIG. 31 and a pixel arrangement 1702 of three lines×two pixels shown in FIG. 32 with a preset pixel arrangement pattern.

In the first embodiment, the noise-occurrence determining unit 1502 determines whether a pixel of interest is a noise-inducing pixel by using image data that has been shifted by the input-image control unit 127; however, other data can be used in this determination. For example, whether a pixel of interest is a noise-inducing pixel can be determined by using not-yet-shifted image data. In a case where the binary image data supplied to the input-image control unit 127 from the image processing unit 124 is converted into 4-bit image data that indicates a color density as a value ranging from 0 to 15, the determination can be made by increasing the number of the pixel arrangement patterns. Alternatively, the determination can be made by using a density value represented by higher-order bits of the 4-bit image data. This permits reduction in the number of bits of image data to be input to the noise-occurrence determining unit 1502.

Figure 33:
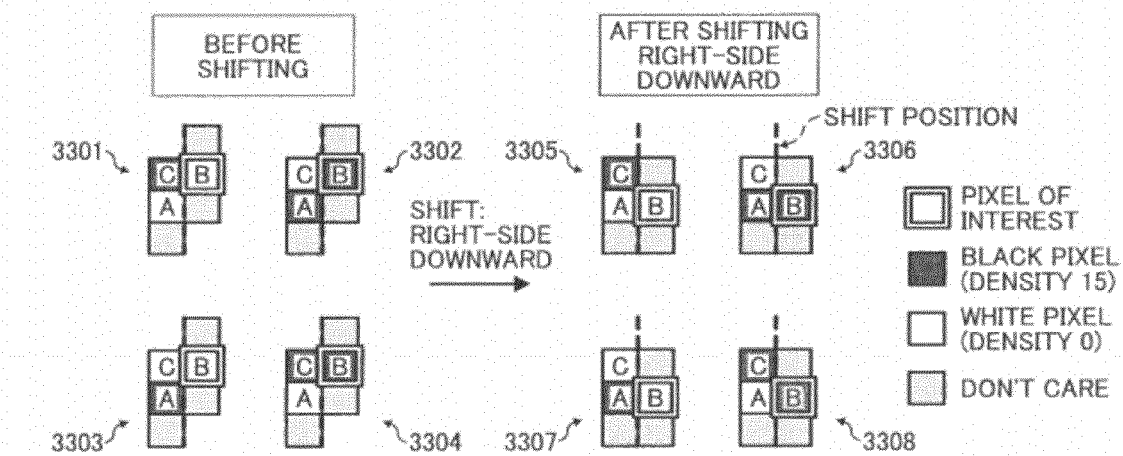
FIG. 33 is a schematic explanatory diagram of pixels in the vicinity of a shift position before and after corrective shifting.
Figure 34:
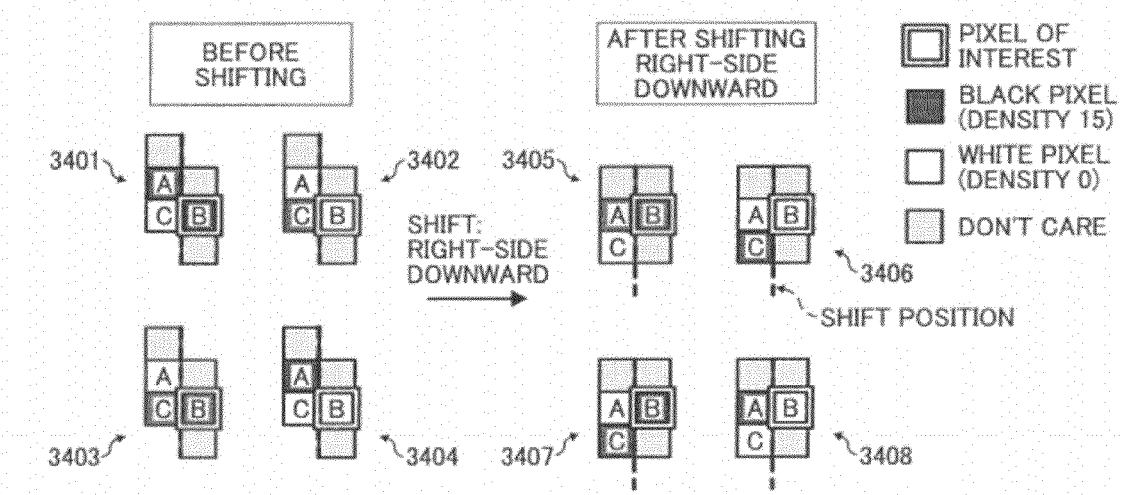
FIG. 34 is another schematic explanatory diagram of pixels in the vicinity of a shift position before and after corrective shifting.

FIGS. 33 and 34 are schematic diagrams for explaining pixels in the vicinity of a shift position before and after corrective shifting. Pixel arrangements 3301 to 3304 of FIG. 33 and pixel arrangements 3401 and 3404 of FIG. 34 are pixels (three lines×two pixels) in the vicinity of the shift position before the corrective shifting. Pixel arrangements 3305 to 3308 of FIG. 33 and pixel arrangements 3405 and 3408 of FIG. 34 are pixels (three lines×two pixels) in the vicinity of the shift position after the corrective shifting. A pixel B is a pixel of interest. Because a pixel adjacent to the pixel B is changed from a pixel C to a pixel A by the corrective shifting, a color density of the pixel adjacent to the pixel B changes. Hence, the noise-occurrence determining unit 1502 determines that the pixel B is a noise-inducing pixel.

Figure 35:
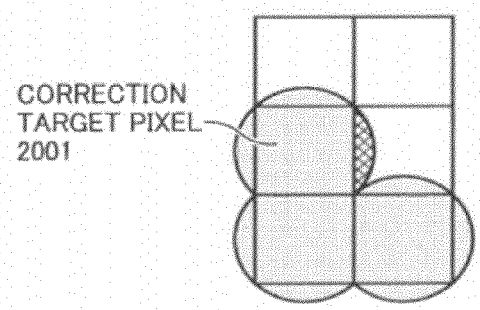
FIG. 35 is a schematic diagram of an example of a correction target pixel that is determined based on pixels in the vicinity of a shift position.
Figure 36:
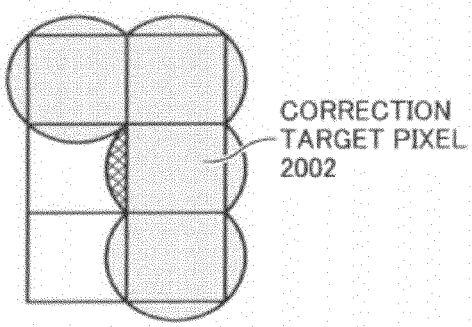
FIG. 36 is a schematic diagram of an example of a correction target pixel that is determined based on pixels in the vicinity of a shift position.

When the noise-occurrence determining unit 1502 determines that a pixel of interest is a noise-inducing pixel (Yes at Step S1512), the correction-target-pixel selecting unit 1503 determines any one of the pixel of interest and a pixel in the vicinity of the pixel of interest that increases or decreases a color density as a pixel for which density correction of image data is to be performed (hereinafter, "correction target pixel") (Step S1513). FIGS. 35 and 36 are schematic diagrams of examples of correction target pixels that are determined based on the pixels in the vicinity of the shift position.

Assume that, for example, a pixel of interest (pixel having the cross-hatched area) in the pixel arrangement 1701 in the vicinity of the shift position of FIG. 31 is determined as being a noise-inducing pixel. In this case, as shown in FIG. 35, the correction-target-pixel selecting unit 1503 selects, as the correction target pixel, a pixel 2001 of which toner area coverage has been changed from among the pixels in the pixel arrangement 1701 in the vicinity of the shift position. In contrast, assume that a pixel of interest (pixel having the cross-hatched area) in the pixel arrangement 1702 in the vicinity of the shift position in FIG. 32 is determined as being a noise-inducing pixel. In this case, as shown in FIG. 36, the correction-target-pixel selecting unit 1503 selects, as the correction target area, a pixel 2002 of which toner area coverage has been changed from among the pixels in the pixel arrangement 1702 in the vicinity of the shift position.

More specifically, when image data representing the pixel arrangement 3304 of FIG. 33 is output without being subjected to corrective shifting, a toner-overlapping area of the pixel B (black pixel), which is the pixel of interest, and the pixel C (black pixel) does not appear as an additional toner area coverage. On the other hand, when the image data representing the pixel arrangement 3304 is subjected to corrective shifting and output as image data representing the pixel arrangement 3308 of FIG. 33, the area where the pixel B and the pixel C have overlapped each other before the corrective shifting changes to a toner-overlapping area of the pixel B and a pixel A (white pixel). Accordingly, a toner area coverage increases by an amount of the area where the pixel B and the pixel C have overlapped each other before the corrective shifting. This is because, as described above, a laser beam spot-size is larger than a single pixel area. Hence, the correction-target-pixel selecting unit 1503 selects the pixel B as the correction target pixel from among the pixels in the pixel arrangement 3308 in the vicinity of the shift position of FIG. 33.

When image data representing the pixel arrangement 3302 of FIG. 33 is output without being subjected to corrective shifting, a toner-overlapping area of the pixel B (black pixel), which is the pixel of interest, and the pixel C (white pixel) appears as an additional toner area coverage. On the other hand, when the image data representing the pixel arrangement 3302 is subjected to corrective shifting and output as image data representing the pixel arrangement 3306 of FIG. 33, the toner-overlapping area of the pixel B (black pixel) and the pixel A (black pixel) does not appear as the additional toner area coverage any more. As a result, a total toner area coverage decreases. Hence, the correction-target-pixel selecting unit 1503 selects the pixel A or the pixel C as the correction target pixel from among the pixels in the pixel arrangement 3306 in the vicinity of the shift position of FIG. 33. In this manner, the correction target pixel is uniquely determined from color density distribution of the pixel of interest and pixels in the vicinity of the pixel of interest.

Figure 37:
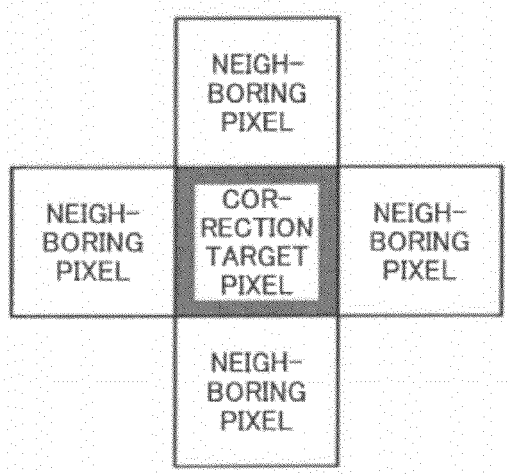
FIG. 37 is a schematic explanatory diagram of an example of neighboring pixels for which color density determination is performed.

The density-distribution determining unit 1504 determines color densities of image data represented by neighboring pixels that neighbor the pixel determined as the correction target pixel by the correction-target-pixel selecting unit 1503 (Step S1514). FIG. 37 is a schematic explanatory diagram of an example of neighboring pixels for which color density determination is performed. In the first embodiment, the density-distribution determining unit 1504 determines a color density (0 or 15) of image data represented by each of four neighboring pixels of the correction target pixel. The neighboring pixels are an upper neighboring pixel, a lower neighboring pixel, a left neighboring pixel, and a right neighboring pixel.

Figure 38:
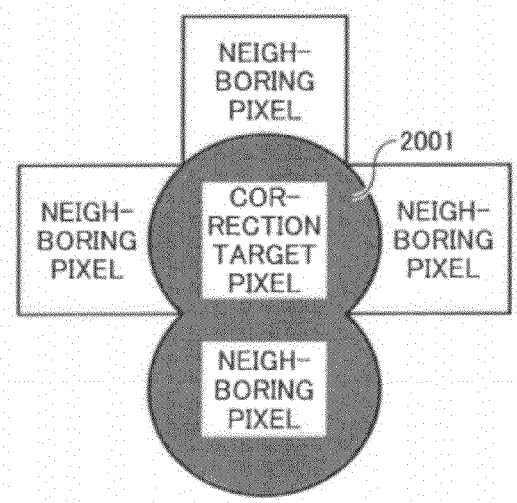
FIG. 38 is a schematic diagram of an example of upper, lower, left, and right neighboring pixels of the correction target pixel shown in FIG. 35.
Figure 39:
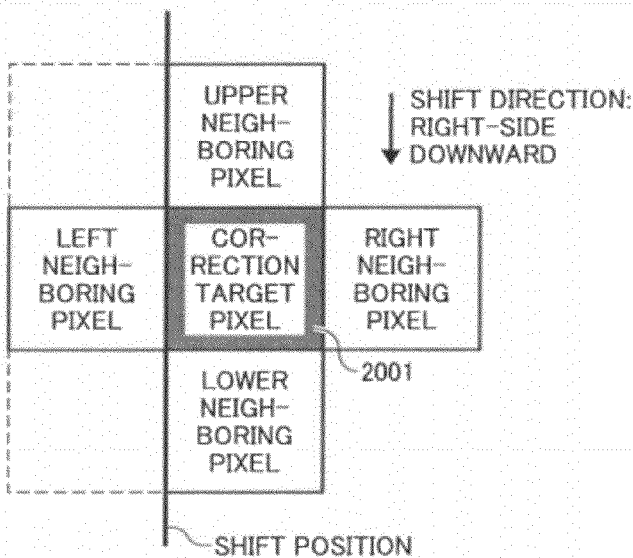
FIG. 39 is a schematic diagram of an example of pixel sizes of the upper, lower, left, and right neighboring pixels shown in FIG. 38.

The density correcting unit 1505 corrects the color density of image data to be represented by the correction target pixel (Step S1515). This correction is performed based on an area to be covered by a toner image (i.e., toner area coverage) on a correction target pixel. The toner image would be formed based the color densities determined by the density-distribution determining unit 1504. FIG. 38 is a schematic diagram of an example of the upper, lower, left, and right neighboring pixels of the correction target pixel shown in FIG. 35. FIG. 39 is a schematic diagram of an example of pixel sizes of the upper, lower, left, and right neighboring pixels of the correction target pixel. When, for example, the color density of the lower neighboring pixel is 15 (i.e., black pixel) and the color density of the other neighboring pixels is 0 (i.e., white pixel) as shown in FIG. 38, a toner image of the lower neighboring pixel is greater than its pixel size. In this case, the lower neighboring pixel has a toner area coverage within the correction target pixel 2001. Meanwhile, density correction of the correction target pixel 2001 does not affect the toner area coverage within the lower neighboring pixel. The density correcting unit 1505 corrects a color density of image data to be represented by the correction target pixel 2001 so as to appropriately compensate an increase or decrease of the toner area coverage. This correction is performed by correcting the color density of image data to be represented by the correction target pixel 2001 based on an area (toner area coverage) of the correction target pixel 2001 to be covered by the neighboring pixels on a toner image. The toner image would be formed based on the color density, 15, of the lower neighboring pixel.

FIGS. 40 to 43 are schematic diagrams for explaining how color density correction of image data represented by a correction target pixel is performed by way of examples.

Figure 40:
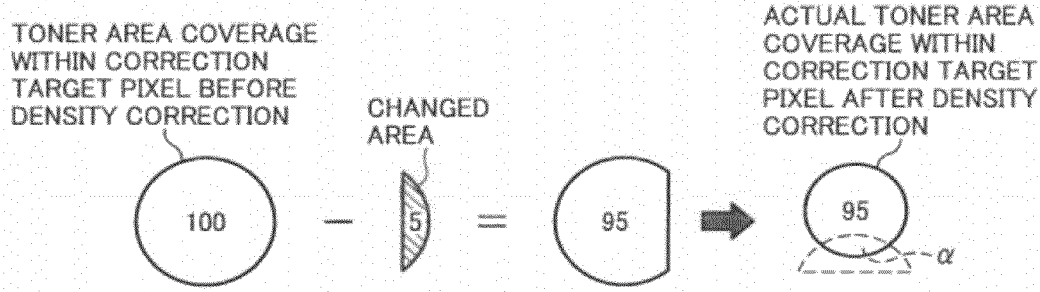
FIG. 40 is a schematic diagram for explaining how color density correction of image data represented by a correction target pixel is performed by way of an example.

A color density of image data represented by a correction target pixel has been conventionally corrected as shown in FIG. 40. Specifically, density has been corrected such that a toner area coverage of a correction target pixel after density correction attains 95 that is a value calculated by subtracting a changed area, 5, from a toner area coverage of the correction target pixel before density correction, 100. The changed area is a toner area coverage increased by corrective shifting and indicated as a hatched area in FIG. 40. When the correction target pixel is overlapped by a toner area coverage (region α indicated by a dotted line) of a neighboring pixel, an actual toner area coverage of the correction target pixel after the density correction is an area covered by the intended post-density-correction toner area coverage and the changed area. Put another way, the actual toner area coverage of the correction target pixel after density correction is not equal to the intended toner area coverage after density correction, 95, that is obtained by subtracting the toner area coverage before density correction, 100, from the changed area, 5. Hence, the conventional technique fails to compensate color density corresponding to the actually changed area of the correction target pixel.

To this end, in the first embodiment, the density correcting unit 1505 corrects a color density of image data represented by a correction target pixel based on a toner area coverage (region α indicated by a dotted line) of the correction target pixel to be covered by at least one neighboring pixel. More specifically, the density correcting unit 1505 performs density correction such that a portion of the toner area coverage of the correction target pixel, excluding the region α, before the density correction (hereinafter, "pre-density-correction toner area coverage") is equal to a portion of the toner area coverage of the correction target pixel, excluding the region α, after the density correction (hereinafter, "post-density-correction toner area coverage") from which the changed area is subtracted. By this density correction, a color density of image data represented by a correction target pixel can be corrected by compensating an increase or decrease of a toner area coverage of the correction target pixel on a toner image represented by the correction target pixel excluding the area to be covered by the at least one neighboring pixel.

Figure 41:
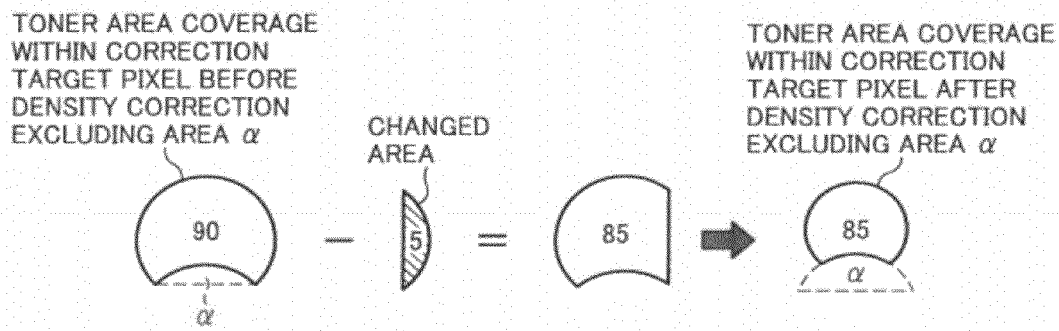
FIG. 41 is a schematic diagram for explaining how color density correction of image data represented by a correction target pixel is performed by way of another example.

In the example shown in FIG. 41, a color density of the image data represented by a correction target pixel is corrected so that a toner area coverage of the correction target pixel, 85, that is obtained by subtracting the changed area, 5, from a pre-density-correction toner area coverage excluding the region π, 90, is equal to 85 that is a post-density-correction toner area coverage excluding the region α, 10. Accordingly, the post-density-correction toner area coverage, 85+10, agrees with a result of subtraction of the changed area, 5, from the pre-density-correction toner area coverage, 100. Hence, an increase in color density corresponding to the changed area can be compensated accurately by excluding a toner area coverage of the lower neighboring pixel on the correction target pixel from the toner area coverage of the correction target pixel.

Figure 42:
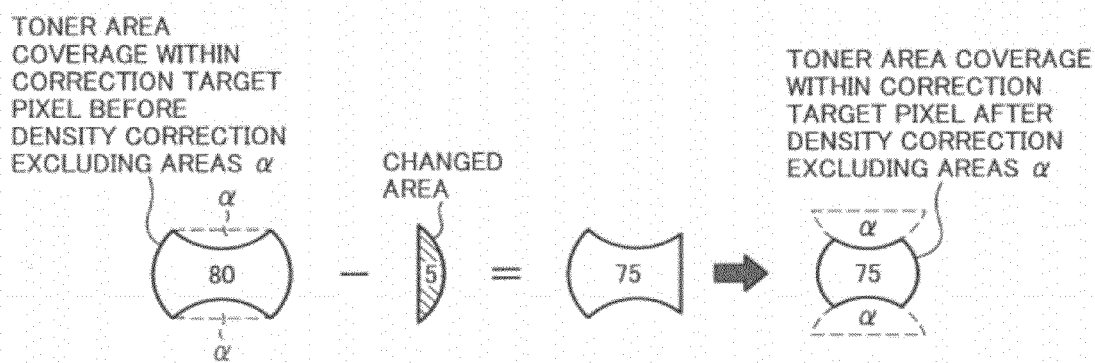
FIG. 42 is a schematic diagram for explaining how color density correction of image data represented by a correction target pixel is performed by way of another example.

In the example shown in FIG. 42, the total area of an upper region α and a lower region α is 20. A color density of the image data represented by a correction target pixel is corrected so that an area, 75, that is obtained by subtracting a changed area, 5, from a pre-density-correction toner area coverage excluding the upper and lower regions α, 80, is equal to a post-density-correction toner area coverage excluding the upper and lower regions α, 75. Accordingly, the post-density-correction toner area coverage, 75+20, agrees with an area obtained by subtracting the changed area, 5, from the pre-density-correction toner area coverage, 100. Hence, an increase in color density corresponding to the changed area can be compensated accurately by excluding a toner area coverage of the lower and upper neighboring pixels on the correction target pixel from the toner area coverage of the correction target pixel.

Figure 43:
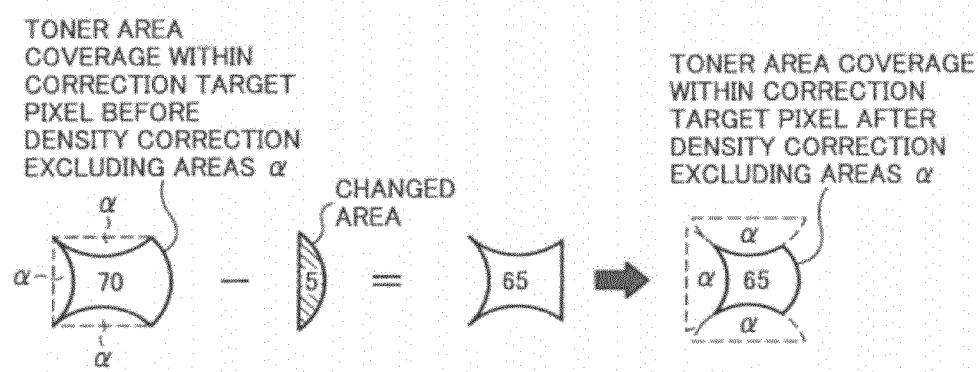
FIG. 43 is a schematic diagram for explaining how color density correction of image data represented by a correction target pixel is performed by way of another example.

In the example shown in FIG. 43, a total area of an upper region α, a lower region α, and a left region α is 30. A color density of the image data represented by a correction target pixel is corrected so that an area, 65, that is obtained by subtracting a changed area, 5, from a pre-density-correction toner area coverage excluding the upper, lower, and the left regions α, 70, is equal to a post-density-correction toner area coverage excluding the upper, lower, and the left regions α, 65. Accordingly, the post-density-correction toner area coverage, 65+30, agrees with an area obtained by subtracting the changed area, 5, from the pre-density-correction toner area coverage, 100. Hence, an increase in color density corresponding to the changed area can be compensated accurately by excluding a toner area coverage of the upper, lower, and left neighboring pixels on the correction target pixel from the toner area coverage of the correction target pixel.

How to correct a color density of image data represented by a correction target pixel will be described by way of an example.

In the first embodiment, the RAM 123 stores therein color densities of image data represented by upper, lower, left, and right neighboring pixels of a correction target pixel and density correction values. The color densities and the density correction values are mapped to each other. The density correction values are for use in correction image data to be represented by the correction target pixel. The density correction values depend on a toner area coverage of the correction target pixel to be covered by a toner image that would be formed based on the color density values of the image data to be represented by neighboring pixels of the correction target pixel. The density values are determined by the density-distribution determining unit 1504. The density correcting unit 1505 reads from the RAM 123 the density correction value mapped to the density values, and corrects the color density of the image data to be represented by the correction target pixel by using the read density correction value.

Figures 44, 45:
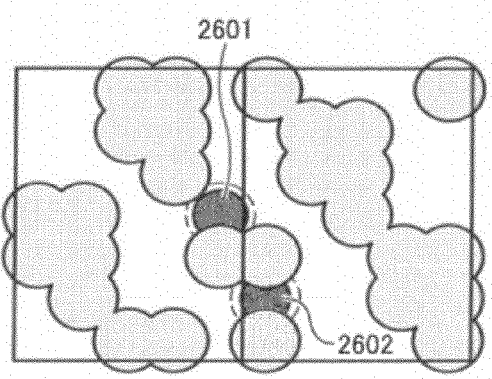
FIG. 44 is a table in which color densities of image data represented by neighboring pixels and density correction values are mapped together.
FIG. 45 is a schematic diagram for explaining how a color density of image data represented by a correction target pixel is corrected by way of an example.

FIG. 44 is a table in which color densities of image data represented by neighboring pixels and density correction values are mapped together. The density correction value depends on an area on the correction target pixel to be covered by a toner image that would be formed based on color densities of image data represented by neighboring pixels of the correction target pixel. In the first embodiment, it is assumed that this table is stored in the RAM 123 in advance. The density correcting unit 1505 reads a density correction value mapped to color densities of the image data represented by the upper, lower, left, and right neighboring pixels (hereinafter, "neighboring-pixel color densities") from the table. The density correcting unit 1505 corrects the color density of the image data to be represented by the correction target pixel (hereinafter, "target-pixel color density") by using the read density correction value. In the first embodiment, it is assumed that a neighboring pixel whose color density is 15 is the neighboring pixel that has a toner area coverage overlapping the correction target pixel on a toner image.

It is depicted in FIG. 35 that the target-pixel color density is 15 and color densities of its upper, lower, left, and right neighboring pixels are 0, 15, 0, and 0, respectively. In this case, the density correcting unit 1505 reads the density correction value −4 corresponding to the pattern 4 from the table shown in FIG. 44, and obtains 11 by subtracting 4 from the previous color density, 15. The density correcting unit 1505 then corrects the target-pixel color density to this value, 11. It is depicted in FIG. 36 that the target-pixel color density is 15 and color densities of its upper, lower, left, and right neighboring pixels are 15, 15, 0, and 0, respectively. In this case, the density correcting unit 1505 reads the density correction value −5 corresponding to the pattern 6 from the table shown in FIG. 44, and obtains 10 by subtracting 5 from the previous color density, 15. The density correcting unit 1505 then corrects the target-pixel color density to this value, 10.

In this manner, according to the first embodiment, a target-pixel color density is corrected based on an area on a correction target pixel to be covered by a toner image that would be formed based on at least one neighboring pixel of the correction target pixel. This permits to compensate a changed area of a toner image of the correction target pixel excluding the toner area coverage of the correction target pixel to be covered by the at least one neighboring pixel. Accordingly, it is possible to accurately compensate an increase or decrease in color density due to a change in toner coverage area resulting from corrective shifting of the image data represented by the correction target pixel.

The corrected-image-data output unit 1506 outputs the image data representing the pixels having undergone the density correction performed by the density correcting unit 1505 to the write-image processing unit 131 (Step S1516). When the noise-occurrence determining unit 1502 determines that the pixel of interest is not a noise-inducing pixel (No at Step S1512), the corrected-image-data output unit 1506 outputs the image data fed from the data selector 1351 to the write-image processing unit 131 without performing the density correction (Step S1517). The LD-data output unit 133 outputs LD light-emission data according to the image data. The LD light-emission data is used to control light emission from the LD. The LD control unit 114 outputs a toner image of the color density according to the image data by using a pulse width modulation (PWM) technique.

FIG. 45 is a schematic diagram for explaining how a color density of image data represented by a correction target pixel is corrected by way of an example. Dotted lines indicate a pre-density-correction toner area coverage. In the first embodiment, a target-pixel color density is corrected such that a changed area of a correction target pixel is compensated excluding an area on the correction target pixel to be covered by a toner image that would be formed based on at least one neighboring pixel of the correction target pixel. This permits more accurate correction of the target-pixel color density. For example, a changed area of a correction target pixel 2602 shown in FIG. 45 is equal to a changed area of a correction target pixel 2601. However, because correction is performed based on the areas of the correction target pixels to be covered by toner images that would be formed based on their neighboring pixels, a toner area coverage within the correction target pixel 2601 is greater than a toner area coverage within the correction target pixel 2602. This is because while the correction target pixel 2601 is to be covered only by the toner image that would be formed based on its lower neighboring pixel, the toner image represented by the correction target pixel 2602 is to be covered by the toner image that would be formed based on its lower and upper neighboring pixels.

In this manner, the skew-correction processing unit 135 according to the first embodiment is capable of correcting a target-pixel color density such that a changed area of a correction target pixel on a toner image is compensated excluding an area on the correction target pixel to be covered by a toner image that would be formed based on at least one neighboring pixel from a toner area coverage of the correction target pixel. Hence, an increase or decrease in the toner area coverage resulting from corrective shifting can be compensated highly accurately. This reduces banding noise in an output of the image data, preventing degradation in image quality.

In a second embodiment according to the present invention, a density correction value for image data represented by a correction target pixel is calculated by using neighboring-pixel color densities. This calculation is performed based on an area on the correction target pixel to be covered by a toner image that would be formed based on color densities of image data represented by at least one neighboring pixel of the correction target pixel. A target-pixel color density is corrected by using the density correction value. Except for the density correcting unit, the structure of an MFP according to the second embodiment is similar with that of the MFP according to the first embodiment.

A density correcting unit 1505*a*, which can be used in place of the density correcting unit 1505 shown in FIG. 28, according to the second embodiment calculates a density correction value for use in correction of a target-pixel color density by using the neighboring-pixel color densities determined by the density-distribution determining unit 1504. The density correction value depends on an area on the correction target pixel to be covered by a toner image that would be formed based on the color densities of image data to be represented by the neighboring pixels. The density correcting unit 1505*a* corrects the target-pixel color density by using the calculated density correction value.

For example, when the shift direction is "down", the density correcting unit 1505*a* calculates the density correction value by using Equation (1):

$$a = -1/15 \times (4 \times x + \Sigma y(n)) + 1 \quad (1)$$

where
a: density correction value
x: target-pixel color density
y(n): neighboring-pixel color density (n=1: upper neighboring pixel, n=2: lower neighboring pixel, n=3: left neighboring pixel, n=4: right neighboring pixel)

FIG. 46 is a table of density correction values calculated from neighboring-pixel color densities by using Equation (1).

In this manner, according to the second embodiment, it is no more necessary to store color densities of image data represented by the upper, lower, left, and right neighboring pixels and density correction values that are mapped to each other in the RAM 123. Because a large memory capacity is no more necessary, an increase in manufacturing cost of the color MFP and an increase in burden on hardware can be suppressed.

In a third embodiment according to the present invention, an example of correcting color density of image data with a configuration simpler than that of the first embodiment will be described. Except for the noise correcting unit, the structure of an MFP according to the third embodiment is similar with that of the MFP according to the first embodiment.

In the third embodiment, the RAM 123 stores therein determination patterns, shift directions, and density correction values that are mapped to one another. Each of the determination patterns shows a pixel arrangement in which a pixel of interest on a shift position is a noise-inducing pixel. The noise-inducing pixel leads to local color density change because of a change in relationship with an adjacent pixel of the noise-inducing pixel. The density correction value is for use in correction of a target-pixel density value and depends on an area on the correction target pixel to be covered by a toner image that would be formed based on color densities of image data to be represented by neighboring pixels of the correction target pixel.

Figure 47:
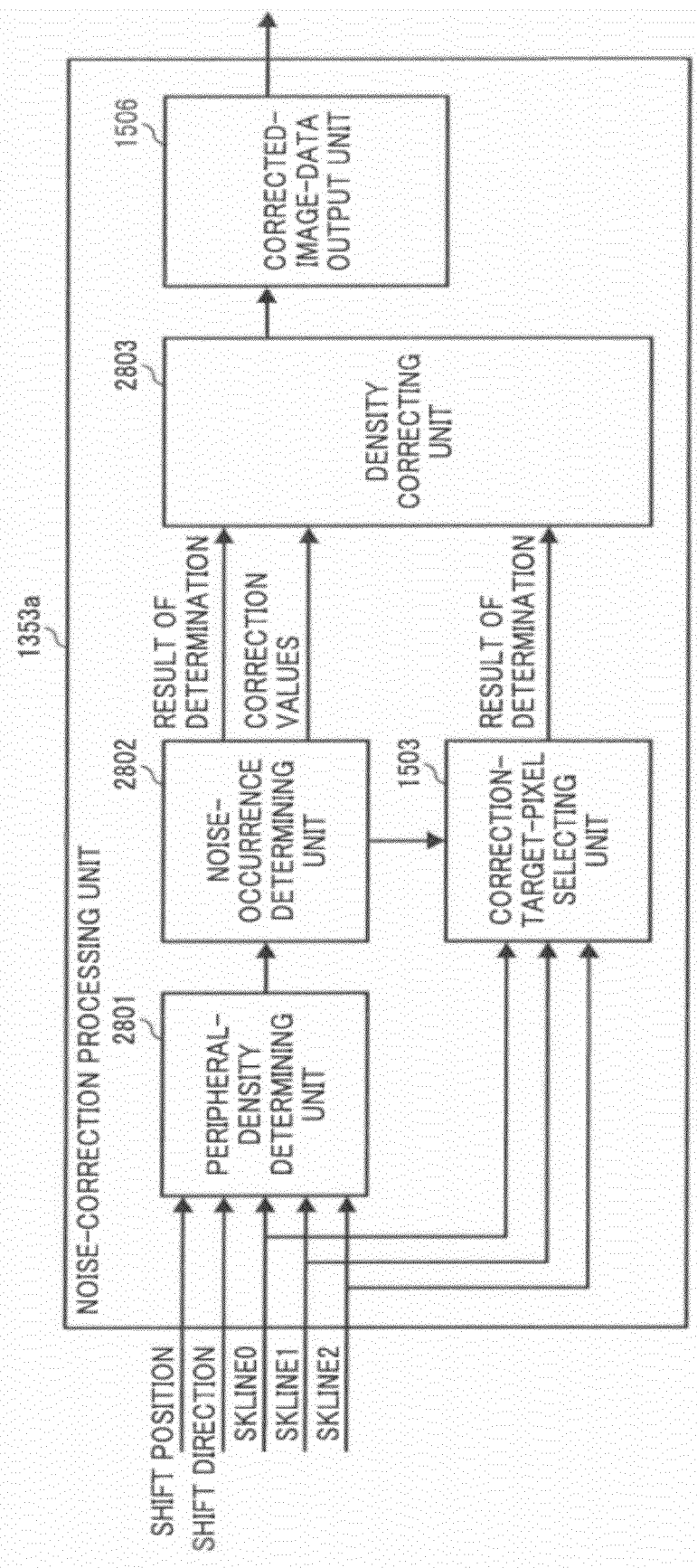
FIG. 47 is a block diagram of a noise-correction processing unit according to a third embodiment of the present invention.
Figure 48:
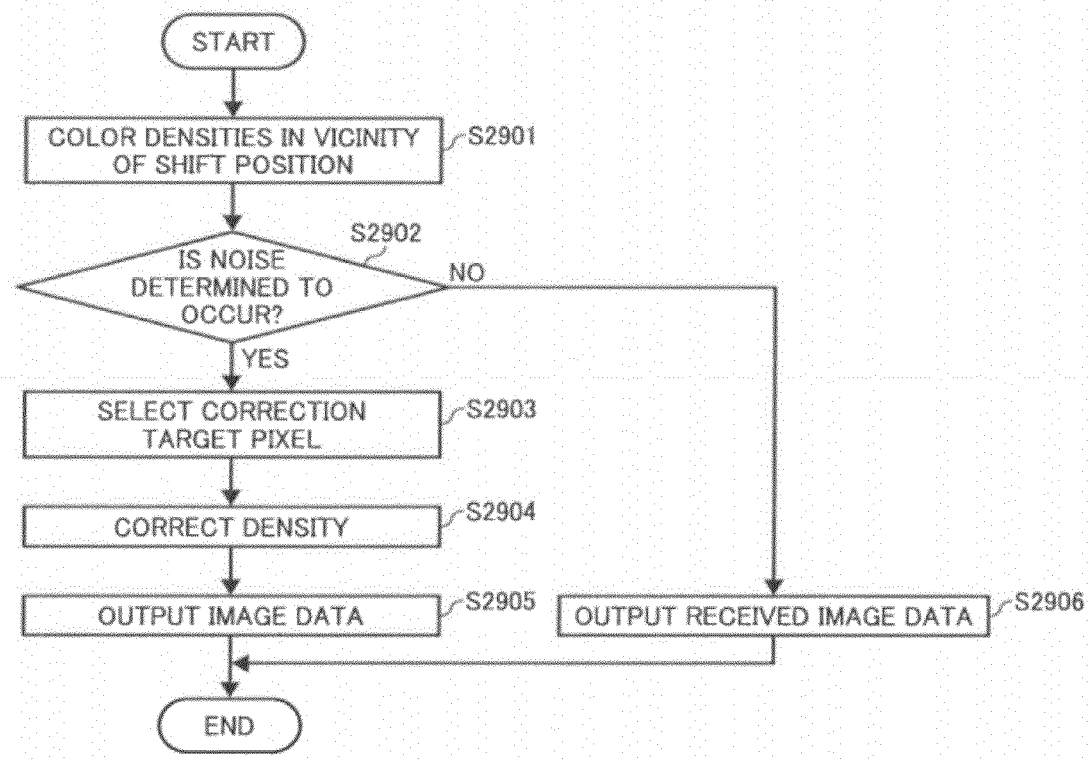
FIG. 48 is a flowchart for explaining how the noise-correction processing unit shown in FIG. 47 performs noise correction.
Figure 49:
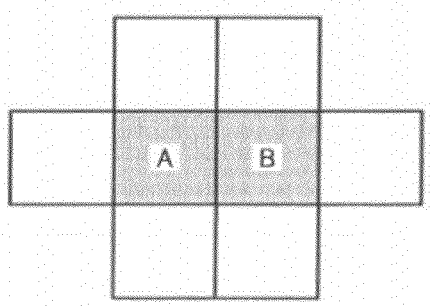
FIG. 49 is a schematic diagram of pixels, in the vicinity of a shift position, of which color densities are to be determined by a peripheral-density determining unit of the noise-correction processing unit shown in FIG. 47.

FIG. 47 is a block diagram of a noise-correction processing unit 1353a, which can be used in place of the noise-correction processing unit 1353 shown in FIG. 27, according to the third embodiment. FIG. 48 is a flowchart for explaining how the noise-correction processing unit 1353a performs noise correction. FIG. 49 is a schematic diagram of pixels in the vicinity of a shift position. A peripheral-density determining unit 2801 determines color densities of the pixels in the vicinity of the shift position.

The noise-correction processing unit 1353a according to the third embodiment differs from the noise-correction processing unit 1353 according to the first embodiment in including the peripheral-density determining unit 2801, a noise-occurrence determining unit 2802, and a density correcting unit 2803 that perform different operations from those of the peripheral-density determining unit 1501, the noise-occurrence determining unit 1502, and the density correcting unit 1505, respectively. Because the operations performed by the correction-target-pixel selecting unit 1503 and the corrected-image-data output unit 1506 according to the third embodiment are similar to those according to the first embodiment, repeated description thereof is omitted.

Upon receiving the shift correction information from the skew-output control unit 1352 and the three-line image data from the data selector 1351, the peripheral-density determining unit 2801 determines color densities of image data represented by peripheral pixels that are in the vicinity of the shift position (Step S2901). The peripheral pixels are a portion of the three-line image data received from the data selector 1351. More specifically, the peripheral-density determining unit 2801 stores image data represented by four pixels on a center line, two pixels on the line immediately above the center line, and two pixels on the line immediately below the center line in a register, and determines color densities of the image data stored in the register.

The noise-occurrence determining unit 2802 determines whether a pixel of interest is a noise-inducing noise (Step S2902). When a pixel arrangement and a shift position of the peripheral pixels determined by the peripheral-density determining unit 2801 match the shift position and the pixel arrangement of the determination pattern stored in the RAM 123, the noise-occurrence determining unit 2802 determines that the pixel of interest is a noise-inducing noise.

FIG. 50 is a table of examples of the determination patterns, the shift positions, and the density correction values stored in the RAM 123. In the third embodiment, it is assumed that this table is stored in the RAM 123. Although not shown, the RAM 123 stores therein another table for shift position "up".

The determination pattern is such a pattern made from, when for example any one of the pixel A and the pixel B shown in FIG. 49 is to be selected as a correction target pixel, the pixels A and B and their neighboring pixels. The neighboring pixels are two lower neighboring pixels, two upper neighboring pixels, a left neighboring pixel, and a right neighboring pixel. In the third embodiment, the determination patterns of post-corrective-shifting pixel arrangements are used; however, not limited thereto. For example, whether a pixel of interest is a noise-inducing pixel can be determined by using determination patterns of pe-corrective-shifting pixel arrangements.

The density correction value depends on an area on a correction target pixel to be covered by a toner image that would be formed based on at least one neighboring pixel. More specifically, a target-pixel color density can be corrected by using the density correction value in such a manner that an increase or decrease in toner area coverage of the correction target pixel resulting from corrective shifting is compensated excluding a toner area coverage of the correction target pixel to be covered by the toner image that would be formed based on the neighboring pixel.

When the noise-occurrence determining unit 2802 determines that the pixel of interest is a noise-inducing pixel (Yes at Step S2902), the correction-target-pixel selecting unit 1503 determines the noise-inducing pixel as being the correction target pixel (Step S2903). In the third embodiment, the correction-target-pixel selecting unit 1503 determines any one of the two pixels at the center (the pixel A and the pixel B shown in FIG. 49) as the correction target pixel. In this manner, the correction-target-pixel selecting unit 1503 uniquely determines one of the pixel A and the pixel B that corresponds to the pixel of interest in the determination pattern as the correction target pixel.

The density correcting unit 2803 reads the density correction value mapped to the determination pattern and to the shift direction from the table stored in the RAM 123 and shown in FIG. 50, and corrects the target-pixel color density by using the read density correction value (Step S2904). In the third embodiment, more specifically, the density correcting unit 2803 corrects the target-pixel color density to a value obtained by subtracting the density correction value from the pre-density-correction density value. The system control to be performed at Step S2905 and Step S2906 is similar to that at Step S1516 and Step S1517 shown in FIG. 29, and repeated description thereof is omitted.

In this manner, according to the third embodiment, a color MFP capable of effectively reducing banding noise in an output of image data and thereby preventing degradation in image quality can be constructed with a simple structure as compared with that of the first embodiment.

According an aspect of the present invention, a color density of image data represented by a correction target pixel can be corrected in such a manner that an increase or decrease of a toner area coverage of the correction target pixel on a toner image is compensated while excluding an area on the correction target pixel to be covered by a toner image that would be formed based on neighboring pixels of the correction target pixel from the toner area coverage of the correction target pixel. Accordingly, an increase or decrease of the toner area coverage resulting from corrective shifting can be compensated highly accurately. This offers an advantage of effective reduction in banding noise and prevention against degradation in image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a skew correction unit that performs skew correction on image data by dividing pixels that belong to one line in a main-scanning direction of the image data into pixel blocks at at least one shift position and shifting a pixel block of the pixel blocks in a sub-scanning direction against a direction of skew;
a noise determining unit that determines whether a pixel of interest that is on the shift position is a noise-inducing pixel, the pixel of interest being each pixel on the shift position, the noise-inducing pixel being a pixel that leads to local color density change because of a change in relationship with an adjacent pixel of the noise-inducing pixel;
a selecting unit that selects, when the pixel of interest is determined as being the noise-inducing pixel, any one of the pixel of interest and a pixel in the vicinity of the pixel of interest as a correction target pixel on which correction of a color density is to be performed;
a density determining unit that determines a color density of image data represented by a neighboring pixel of the correction target pixel; and
a correcting unit that corrects the color density of the image data to be represented by the correction target pixel based on an area on the correction target pixel to be covered by a toner image that would be formed based on the color density determined by the density determining unit.

2. The image forming apparatus according to claim 1, further comprising a storage unit that stores therein a color density of the image data represented by the neighboring pixel and a density correction value mapped to the color density, the density correction value being for use in correction of the color density of the image data to be represented by the correction target pixel based on the area on the correction target pixel to be covered by the toner image that would be formed based on the color density determined by the density determining unit, wherein the correcting unit reads from the storage unit the density correction value mapped to the color density determined by the density determining unit, and corrects the color density of the image data to be represented by the correction target pixel by using the density correction value.

3. The image forming apparatus according to claim 1, wherein the correcting unit calculates a density correction value for use in correction of the color density of the image data to be represented by the correction target pixel, the density correction value depending on an area on the correction target pixel that would be covered by a toner image that would be formed based on a color density of image data to be represented by a neighboring pixel of the correction target pixel, and corrects the color density of the image data to be represented by the correction target pixel by using the density correction value.

4. An image forming apparatus comprising:
a skew correction unit that performs skew correction on image data by dividing pixels that belong to one line in a main-scanning direction of the image data into pixel blocks at at least one shift position and shifting a pixel block of the pixel blocks in a sub-scanning direction against a direction of skew;
a storage unit that stores therein determination patterns, shift directions, and density correction values, wherein the determination patterns, the shift directions, and the density correction values are mapped to one another,
each of the determination patterns defines a pixel arrangement in which a pixel of interest that is on the shift position is a noise-inducing pixel that leads to local color density change because of a change in relationship with an adjacent pixel of the noise-inducing pixel, and
the density correction value is for use in correction of a color density of image data represented by a correction target pixel in the pixel arrangement, the correction being to be performed based on an area on the correction target pixel to be covered by a toner image that would be formed based on a color density of image data to be represented by a neighboring pixel of the correction target pixel;
a shift-direction determining unit that determines whether a pixel arrangement and a shift direction of pixels in the vicinity of the shift position match the pixel arrangement of the determination pattern stored in the storage unit and the shift direction mapped to the determination pattern and stored in the storage unit;
a correction-target-pixel determining unit that determines the noise-inducing pixel as being the correction target pixel when the pixel arrangement and the shift direction in the vicinity of the shift position are determined to match the determination pattern and the shift direction stored in the storage unit; and
a correcting unit that reads the density correction value mapped to the determination pattern and to the shift direction from the storage unit, and corrects the color density of the image data to be represented by the correction target pixel by using the density correction value.

5. An image forming method comprising:
performing skew correction on image data by dividing pixels that belong to one line in a main-scanning direction of the image data into pixel blocks at at least one shift position and shifting a pixel block of the pixel blocks in a sub-scanning direction against a direction of skew;
determining whether a pixel of interest that is on the shift position is a noise-inducing pixel, the pixel of interest being each pixel on the shift position, the noise-inducing pixel being a pixel that leads to local color density change because of a change in relationship with an adjacent pixel of the noise-inducing pixel;
selecting, when the pixel of interest is determined as being the noise-inducing pixel, any one of the pixel of interest and a pixel in the vicinity of the pixel of interest as a correction target pixel on which correction of a color density is to be performed;
determining a color density of image data represented by a neighboring pixel of the correction target pixel; and
correcting the color density of the image data to be represented by the correction target pixel based on an area on the correction target pixel to be covered by a toner image that would be formed based on the color density having been determined.

* * * * *